(12) United States Patent
Kimura

(10) Patent No.: US 11,634,278 B2
(45) Date of Patent: Apr. 25, 2023

(54) ARTICLE TRANSPORT VEHICLE

(71) Applicant: Daifuku Co., Ltd., Osaka (JP)

(72) Inventor: Kazunari Kimura, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 17/438,602

(22) PCT Filed: Mar. 18, 2020

(86) PCT No.: PCT/JP2020/011922
§ 371 (c)(1),
(2) Date: Sep. 13, 2021

(87) PCT Pub. No.: WO2020/196144
PCT Pub. Date: Oct. 1, 2020

(65) Prior Publication Data
US 2022/0135323 A1    May 5, 2022

(30) Foreign Application Priority Data

Mar. 22, 2019  (JP) .............................. JP2019-055359

(51) Int. Cl.
*B65G 1/04*    (2006.01)
(52) U.S. Cl.
CPC ......... *B65G 1/0421* (2013.01); *B65G 1/0435* (2013.01)
(58) Field of Classification Search
CPC .............................. B65G 1/0421; B65G 1/0435
See application file for complete search history.

(56) References Cited

U.S. PATENT DOCUMENTS

| 5,927,926 A * | 7/1999 | Yagi ..................... | B65G 1/0407 414/280 |
| 2011/0008138 A1* | 1/2011 | Yamashita ........... | B65G 1/0435 414/277 |
| 2011/0276175 A1* | 11/2011 | Takagawa ............ | B65G 1/0407 700/218 |
| 2015/0037129 A1* | 2/2015 | Okamoto ............. | B65G 1/0435 414/800 |
| 2015/0321845 A1* | 11/2015 | Nakamura ........... | B65G 1/0421 414/273 |
| 2017/0066591 A1* | 3/2017 | Torazawa ............. | B65G 1/0435 |
| 2019/0210802 A1 | 6/2019 | Ueda et al. | |

(Continued)

FOREIGN PATENT DOCUMENTS

| CN | 108602619 A | 9/2018 |
| JP | 948507 A | 2/1997 |

(Continued)

*Primary Examiner* — Kaitlin S Joerger
(74) *Attorney, Agent, or Firm* — The Webb Law Firm

(57) ABSTRACT

An article transport vehicle includes: a transfer device (24) that transfers an article (W) to a housing rack (1) by moving, along a protruding/retracting direction (A), a contact portion (46) that comes into contact with an article (W); a pair of first guide portions (28) that are located on opposite sides in a width direction (B) relative to an article (W) being transferred by the transfer device (24) and guide the article (W) in the protruding/retracting direction (A); a guide driving device (29) that changes a distance (D) between the two first guide portions (28) in the width direction (B); and a control unit (H) that controls the guide driving device (29).

11 Claims, 11 Drawing Sheets

(56) References Cited

U.S. PATENT DOCUMENTS

| | | | | |
|---|---|---|---|---|
| 2020/0165082 A1* | 5/2020 | Ueda | ........................ | B65B 35/40 |
| 2020/0231420 A1* | 7/2020 | Ueda | ....................... | B65G 61/00 |
| 2020/0324969 A1 | 10/2020 | Ueda et al. | | |
| 2021/0395007 A1* | 12/2021 | Galluzzo | .............. | B65G 1/1375 |

FOREIGN PATENT DOCUMENTS

| | | | |
|---|---|---|---|
| JP | 2012121723 A | 6/2012 | |
| JP | 201650112 A | 4/2016 | |
| WO | 2019017294 A1 | 1/2019 | |

* cited by examiner

ARTICLE TRANSPORT VEHICLE

CROSS-REFERENCE TO RELATED APPLICATIONS

This application is the United States national phase of International Application No. PCT/JP2020/011922 filed Mar. 18, 2020, and claims priority to Japanese Patent Application No. 2019-055359 filed Mar. 22, 2019, the disclosures of which are hereby incorporated by reference in their entirety.

BACKGROUND OF THE INVENTION

1. Field of the Invention

The present invention relates to an article transport vehicle including: a travel carriage that travels along a housing rack that houses an article; and a transfer device that is installed on the travel carriage and that transfers an article to the housing rack by moving a contact portion that comes into contact with an article such that the contact portion protrudes from a retracted position to a protruding position along a protruding/retracting direction.

2. Description of Related Art

JP 2016-050112 describes an article transport vehicle including a travel carriage that travels along a housing rack that houses an article, and a transfer device that transfers the article by protruding and retracting to and from the housing rack (the reference numerals or terms in parentheses in the description of "Background Art" are those described in the aforementioned document). This article transport vehicle includes a pair of first guide portions (guide bodies (28)) located on opposite sides in the width direction (rack lateral width direction (X)) of an article transferred by a transfer device (11). The first guide portions guide the article in a protruding/retracting direction (rack front-rear direction (Y)) when the article is transferred to a storage rack (article storage rack (2)) by the transfer device.

A pair of second guide portions (placement support bodies (2b)) are provided in a housing rack to which the transfer device of the article transport vehicle transfers the article. The second guide portions are located on opposite sides in the width direction of the article transferred by the transfer device, and can guide the article in a transfer direction. By providing the second guide portions in the housing rack in this manner, when an article is transferred from the transfer device to the housing rack, the article can be guided from the transfer device by the first guide portions and the second guide portions until the article is housed in the housing rack.

Patent Document 1: JP 2016-050112A

SUMMARY OF THE INVENTION

However, for example, when a stop position of the travel carriage relative to the housing rack is displaced in the width direction, these guide portions may prevent the transfer device from appropriately transferring the article. For example, at end portions of the pair of second guide portions at which the transfer device is present, guide surfaces that are inclined in a direction in which the distance between the second guide portions increases toward the transfer device side can be provided in advance. In the case where such guide surfaces are provided, when an article is displaced relative to the pair of second guide portions in the width direction, it is possible to guide the article to an appropriate position relative to the pair of second guide portions in the width direction by guiding the article via the guide surfaces of the second guide portions. However, the article that is being moved is guided not only by the second guide portions, but also by the first guide portions, and the movement thereof in the width direction is restricted. Accordingly, for example, when the displacement between the first guide portions and the second guide portions in the width direction is large, the article may become caught between the first guide portions and the second guide portions, and may not be appropriately transferred to the housing rack by the article transfer device.

Therefore, it is desirable to realize an article transport vehicle that can appropriately transfer an article even when a transfer device is displaced relative to a housing rack in the width direction.

In view of the foregoing, an article transport vehicle includes: a travel carriage that travels along a housing rack that houses an article; and a transfer device that is installed on the travel carriage and that transfers an article to the housing rack by moving a contact portion that comes into contact with an article such that the contact portion protrudes from a retracted position to a protruding position along a protruding/retracting direction, wherein, assuming that a width direction is a direction orthogonal to the protruding/retracting direction in a vertical view along a vertical direction, the article transport vehicle further includes: a pair of first guide portions that are located on opposite sides in the width direction relative to an article being transferred by the transfer device and that guide the article in the protruding/retracting direction; a guide driving device that changes a distance between the two first guide portions in the width direction; and a control unit that controls the guide driving device, and the control unit controls the guide driving device so as to increase the distance between the two first guide portions in the width direction during a period from start to completion of movement of the contact portion from the retracted position to the protruding position.

With this configuration, the distance between the two first guide portions in the width direction is not increased until partway through the movement of the contact portion from the retracted position to the protruding position. Accordingly, when an article is transferred from the transfer device to the housing rack, the article can be appropriately guided in the protruding/retracting direction by the pair of first guide portions. Also, after partway through the movement of the contact portion from the retracted position to the protruding position, the distance between the two first guide portions in the width direction is increased. Accordingly, the restriction imposed by the first guide portions on the movement of the article in the width direction is reduced. This makes it possible to prevent the article from being caught between the housing rack and the first guide portions even if the article is moved in the width direction by the housing rack, for example, when the stop position of the travel carriage relative to the housing rack is displaced in the width direction. Therefore, it is possible to appropriately transfer the article even when the displacement of the transfer device relative to the housing rack in the width direction is relatively large.

Further features and advantages of the article transport vehicle will become apparent from the following description of embodiments with reference to the drawings.

DETAILED DESCRIPTION OF PREFERRED EMBODIMENTS

1. Embodiment

Figure 1:
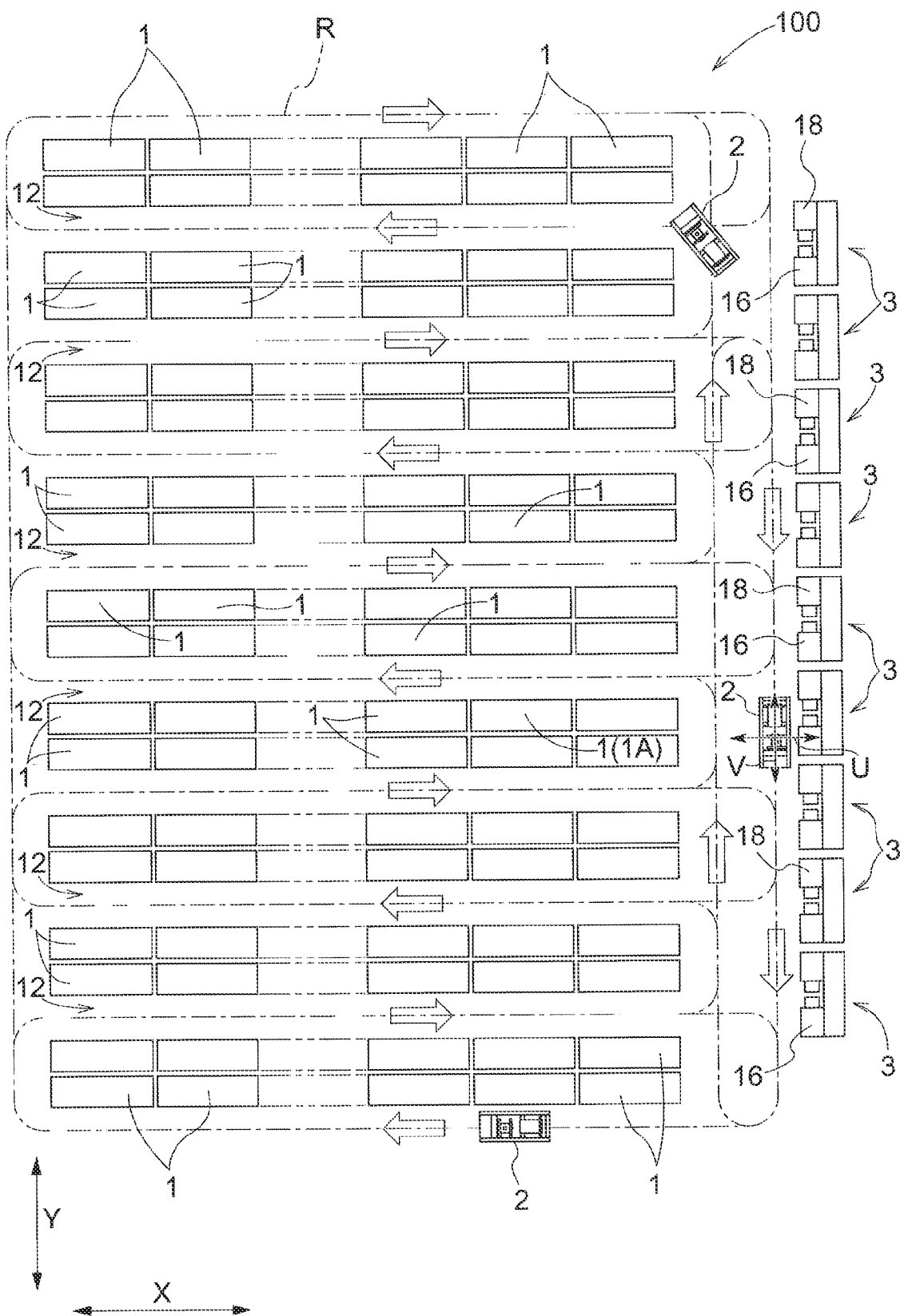
FIG. 1 is a plan view of a transport facility.
Figure 2:
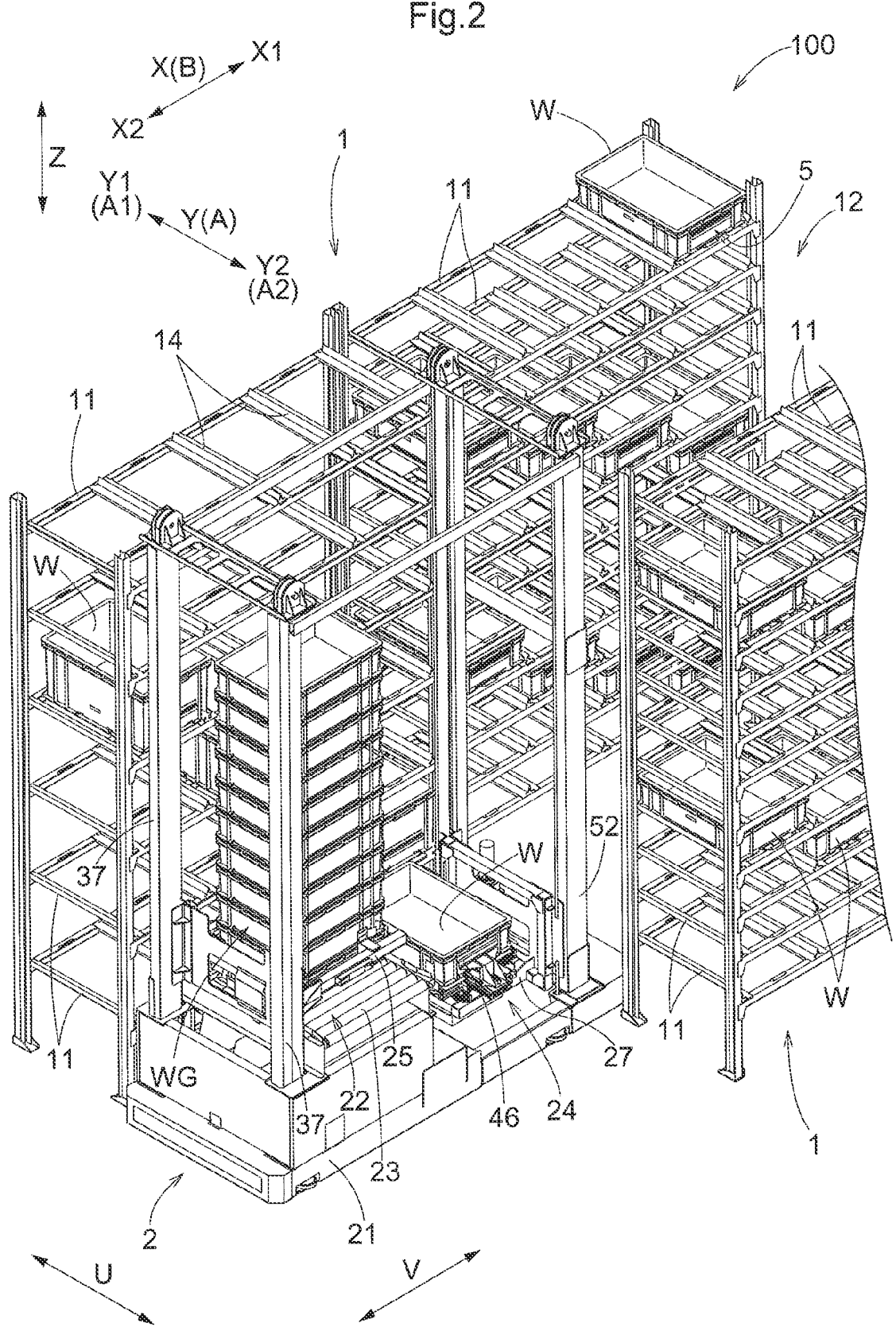
FIG. 2 is a perspective view of an article transport vehicle and a housing rack.

Hereinafter, an embodiment of the article transport vehicle will be described with reference to the drawings. FIG. 2 is a perspective view showing an example of an article transport vehicle 2 and a housing rack 1 that houses a container W serving as an article, and FIG. 1 is a plan view in a vertical view along a vertical direction Z (see FIG. 2) of a transport facility 100 including the article transport vehicle 2 and the housing rack 1. As shown in FIGS. 1 and 2, a plurality of article transport vehicles 2 travel along a travel path R of the transport facility 100 to transport containers W serving as articles. The transport facility 100 includes a plurality of housing racks 1 that house the containers W serving as the articles, and a loading/unloading portion 3 that loads and unloads a container group WG in which the containers W are stacked in the vertical direction Z. Each article transport vehicle 2 includes a travel carriage 21 that travels along the housing rack 1 that houses the container W, and a transfer device 24 that is installed on the travel carriage 21 and that transfers the container W to the housing rack 1 by moving an engaging portion 46 (contact portion) that comes into contact with the container W such that the engaging portion 46 protrudes from a retracted position to a protruding position along a protruding/retracting direction A.

The following description will be given assuming that directions that are orthogonal to each other in a vertical view along the vertical direction Z are a first direction X and a second direction Y. It is also to be assumed that one side in the first direction X is a first-direction first side X1, the side opposite thereto is a first-direction second side X2, and one side in the second direction Y is a second-direction first side Y1, and the side opposite thereto is a second-direction second side Y2. It is also to be assumed that, with respect to the article transport vehicle 2, a direction extending along an advancing direction of the article transport vehicle 2 in the vertical view is a front-rear direction V, and a direction orthogonal to the front-rear direction V in the vertical view is a lateral direction U.

Housing Rack

As shown in FIG. 2, each housing rack 1 includes, in a plurality of levels in the vertical direction Z, rack portions 11 that support the containers W. On the rack portions 11, a plurality of unstacked containers W are supported so as to be arranged in the first direction X of the housing rack 1. The unstacked containers W are supported, one on each rack portion 11 in a direction extending along the second direction Y of the housing rack 1. Accordingly, the direction extending along the longitudinal direction of the housing rack 1 corresponds to the first direction X. As shown in FIG. 1, a plurality of housing racks 1 are installed so as to be oriented along the first direction X. The plurality of housing racks 1 are installed in a state in which two housing racks 1 whose front surfaces oppose each other are adjacent so as to be spaced apart from each other by a first rack distance that allows the formation of an inter-rack passage 12, which will described below, therebetween in the second direction Y, and two housing racks 1 whose rear surfaces oppose each other are adjacent so as to be spaced apart from each other by a second rack distance that is shorter than the first rack distance in the second direction Y. Note that this does not exclude a case where the second rack distance is zero and two housing racks 1 are installed with the rear surfaces thereof abutted against each other. An inter-rack passage 12 is formed between the two housing racks 1 that are adjacent to each other with the first rack distance therebetween, and the inter-rack passage 12 is used as a passage through which the article transport vehicle 2 travels. When the article transport vehicle 2 travels through the inter-rack passage 12, the article transport vehicle 2 travels along the front surfaces of the housing racks 1. Note that no inter-rack passage 12 is formed between the two housing racks 1 whose rear surfaces oppose each other.

Next, an additional description will be given of the details of the housing rack 1. Here, a housing rack 1 adjacent to the inter-rack passage 12 on the second-direction first side Y1 will be described. The housing rack 1 adjacent to the inter-rack passage 12 on the second-direction second side Y2 is configured in the same manner as the housing rack 1 adjacent to the inter-rack passage 12 on the second-direction first side Y1, except that the installation orientation is different, and therefore the description thereof will be omitted.

As will be described below with reference to FIG. 4 and so forth, the transfer device 24 includes a pair of first guide portions 28 that guide the container W when transferring the container W. Each of the two first guide portions 28 includes a first guide surface F1 that guides the container W, and the first guide surface F1 includes a first parallel portion 28A and a first inclined portion 28B. The housing rack 1 includes second guide portions 14 that work cooperatively with the first guide portions 28.

Figure 3:
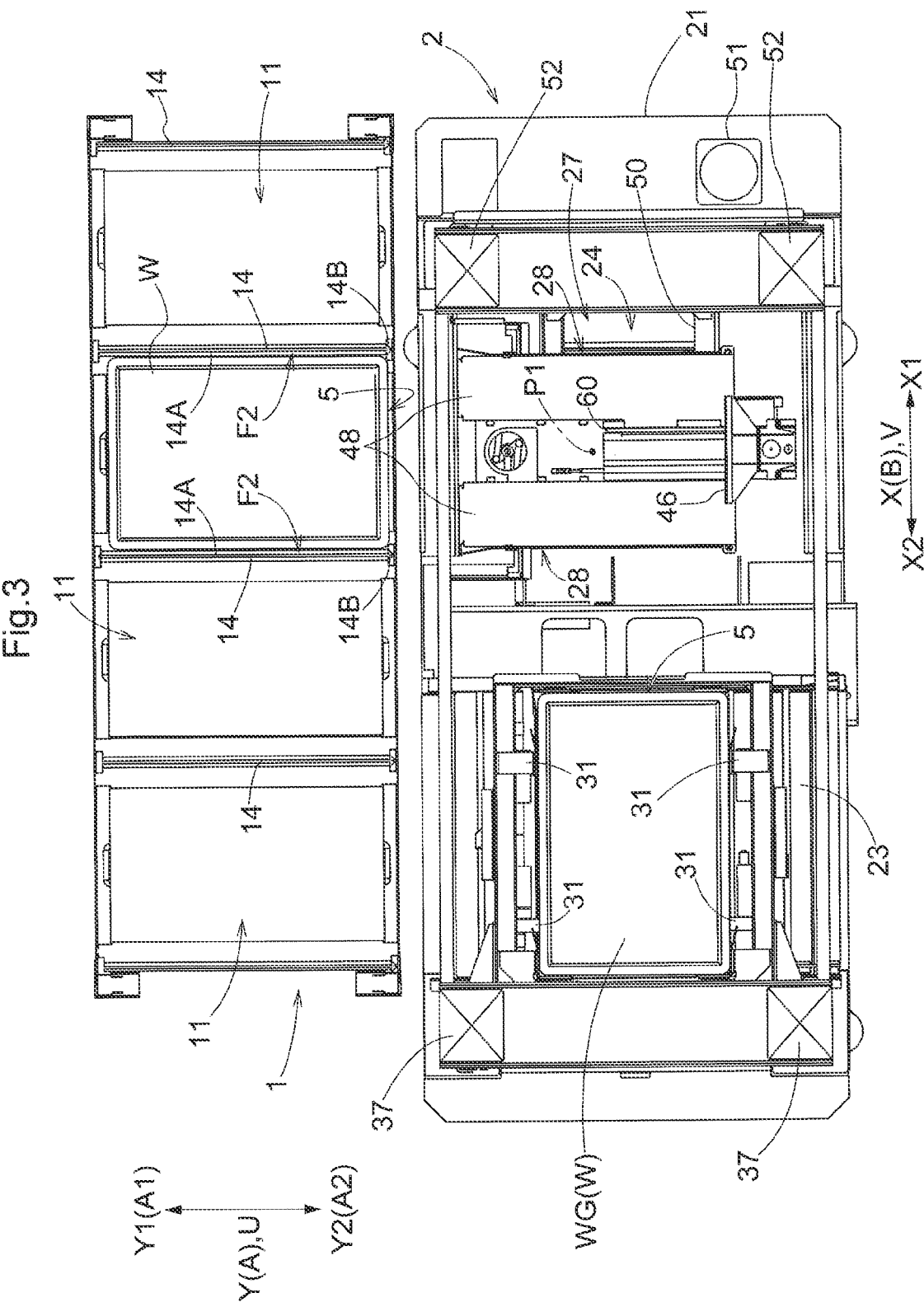
FIG. 3 is a plan view of the article transport vehicle and the housing rack.
Figure 15:
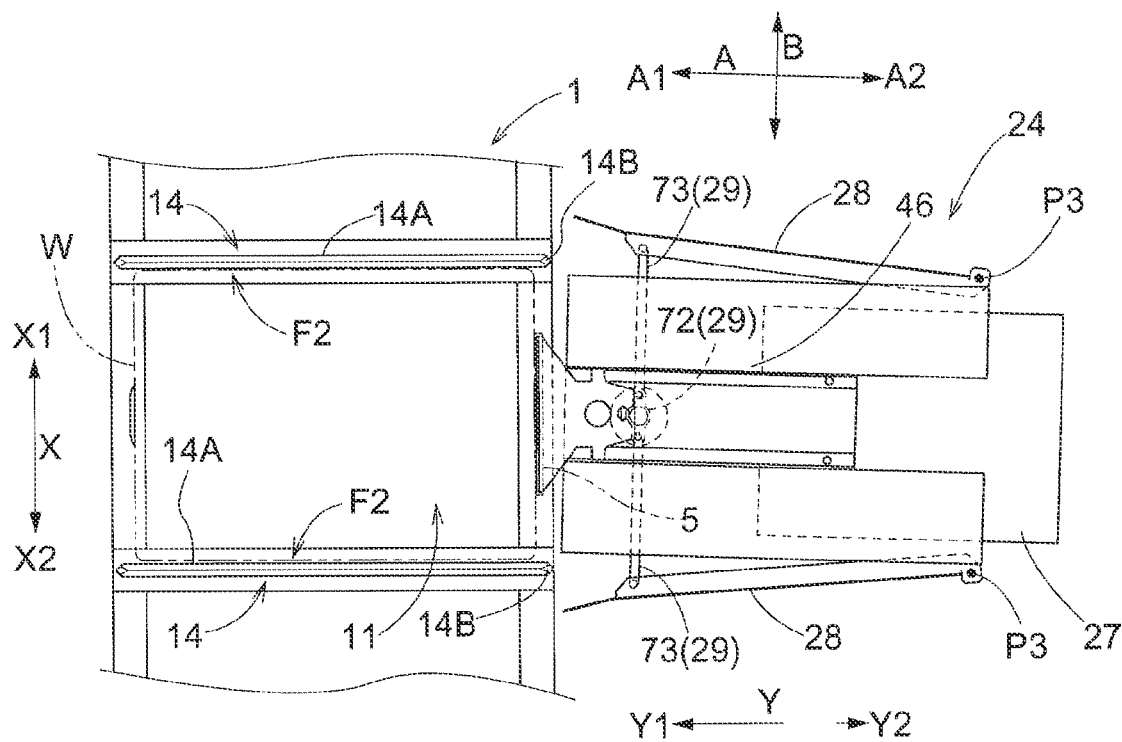
FIG. 15 is a plan view showing a state in which the engaging portion is at a protruding position.

As shown in FIGS. 2 and 3, the housing rack 1 includes a pair of second guide portions 14 that are located on opposite sides in the first direction X of the container W transferred by the transfer device 24, and that guide the container W in the second direction Y (also corresponding to a protruding/retracting direction A, which will be described below). The pair of second guide portions 14 are provided in the rack portion 11. Each of the two second guide portions 14 includes a second guide surface F2 that guides the container W, and the second guide surface F2 includes a second parallel portion 14A and a second inclined portion 14B. The second parallel portions 14A form portions of the second guide surfaces F2 that extend along a direction parallel to the second direction Y. The second inclined portions 14B form portions of the second guide surfaces F2 that are inclined along a direction in which the second inclined portions 14B separate from each other in the first direction X toward the second-direction second side Y2. Each of the second inclined portions 14B is provided at an end portion on the second-direction second side Y2 of the corresponding second guide portion 14, and is provided so as to be continuous with the corresponding second parallel portion 14A on the second-direction second side Y2 relative to the second parallel portion 14A. As also shown in FIG. 15, the second parallel portions 14A are formed to have a length longer than the length of the container W in the second direction Y, and extend so as to protrude to both the second-direction first side Y1 and the second-direction second side Y2 relative to the container W located at a housed position.

Container

Figure 6:
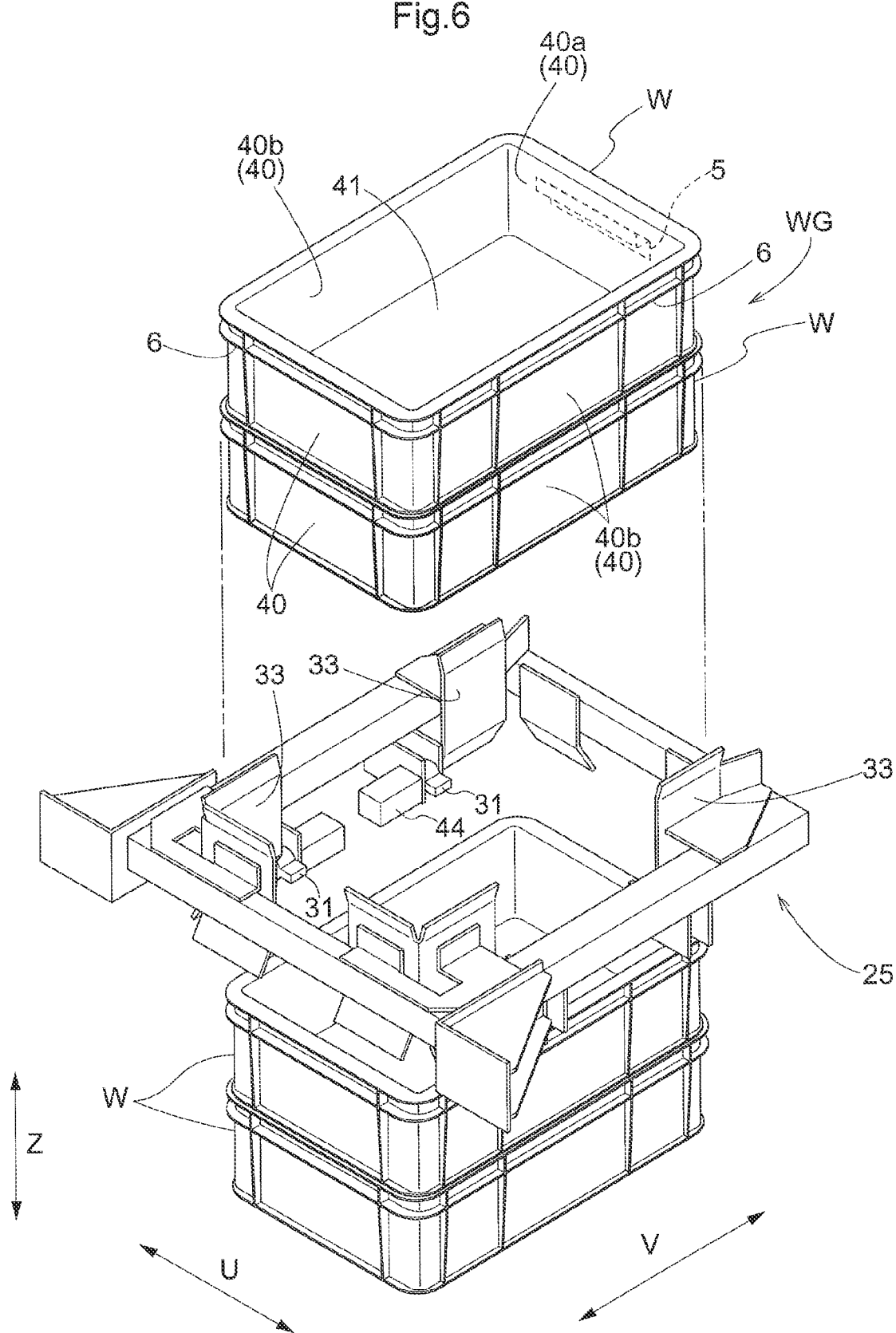
FIG. 6 is a perspective view of a lifting mechanism.

As shown in FIG. 6, each container W is formed with a side wall portion 40 standing upright along the surrounding edge portion of a bottom portion 41, and is formed in the shape of an upwardly open box. The containers W are configured such that an upper end portion of a container W and a lower end portion of another container W are fitted to each other in the vertical direction Z, and the containers W are configured to be stackable in the vertical direction Z. As for the stacked containers W, a housing space is formed between the bottom of a container W and the bottom of another container W stacked thereon, and the containers W are configured to be stackable in a state in which content is housed in the containers W. Note that FIG. 6 illustrates the containers W and a lifting mechanism 25, which will be described below, in a state (which will be described below with reference to FIGS. 2, 3, etc.) in which the containers W are stacked in a support region 22 of a conveyor 23, as shown in FIG. 2, and directions with respect to the article transport vehicle 2 are shown in FIG. 6.

The container W includes an engaged portion 5 with which the engaging portion 46 (see FIGS. 5, 15, etc.) of the transfer device 24 engages when the transfer device 24 of the article transport vehicle 2 transfers the container W. The engaged portion 5 is formed on the side wall portion 40 (first side wall portion 40a) including a surface that faces the transfer device 24 side. For example, the engaged portion 5 is disposed on a surface (surface facing the second-direction second side Y2 in the state shown in FIGS. 2, 3, and 11 to 15) on the inter-rack passage 12 (article transport vehicle 2) side in a state in which the container W is housed in the housing rack 1. For example, the engaged portion 5 is disposed on a surface on the transfer device 24 side (surface facing one side in the front-rear direction V) in a state in which the container W is supported by the conveyor 23 (which will be described below with reference to FIGS. 2, 3, etc.) of the article transport vehicle 2 (see FIG. 3). In the present embodiment, the engaged portion 5 is formed to be engageable with the transfer device 24 from below. As a result of the transfer device 24 engaging with the engaged portion 5 from below, the container W can be moved in the second direction Y between the transfer device 24 and the housing rack 1. In addition, the container W can be moved in the front-rear direction V between the transfer device 24 and the container group WG supported by and stacked on the conveyor 23.

Furthermore, protruding portions 6 protruding in horizontal directions (directions along the first direction X and the second direction Y, and directions along the front-rear direction V and the lateral direction U) from the side wall portion 40 are formed on each container W. Although a detailed description will be given in the description of the lifting mechanism 25, the container W can be lifted by the lifting mechanism 25 by the supporting portion 31 of the lifting mechanism 25 abutting against, from below, the protruding portions 6 protruding from two second side wall portions 40b that face a direction intersecting the direction in which the first side wall portion 40a faces in a plan view.

Loading/Unloading Portion

As described above, the transport facility 100 includes the loading/unloading portions 3 for loading and unloading the container group WG in which the containers W are stacked in the vertical direction Z. As shown in FIG. 1, each loading/unloading portion 3 includes a loading portion 16 and an unloading portion 18. The container group WG in which a plurality of containers W are stacked in the vertical direction Z is loaded into the loading portion 16. The containers W constituting the container group WG loaded into the loading portion 16 are stored in a plurality of housing racks 1 by the article transport vehicle 2. The article transport vehicle 2 forms a container group WG by stacking, in the vertical direction Z, the containers W retrieved from the plurality of housing racks 1, and transports the container group WG to the unloading portion 18.

Article Transport Vehicle

As shown in FIGS. 2 and 3, the article transport vehicle 2 includes the travel carriage 21 that travels along the housing rack 1, and the transfer device 24 that is installed on the travel carriage 21 and that transfers the container W to and from the housing rack 1. The transfer device 24 transfers the container W from the transfer device 24 to the housing rack 1 by moving the engaging portion 46 serving as the contact portion that comes into contact with the container W, from the retracted position to the protruding position along the protruding/retracting direction A, which is the direction in which the transfer device 24 protrudes or retracts. In addition, the transfer device 24 transfers the container W from the housing rack 1 to the transfer device 24 by moving the engaging portion 46 from the protruding position to the retracted position along the protruding/retracting direction A. Note that a direction orthogonal to the protruding/retracting direction A as viewed in the vertical direction Z is referred to as a width direction B of the transfer device 24.

Next, an additional description will be given of the details of the article transport vehicle 2. In this description, the directions are defined based on a state in which the article transport vehicle 2 is located on the inter-rack passage 12 as shown in FIGS. 2 and 3. That is, the description will be given assuming that the direction (front-rear direction V) in which the article transport vehicle 2 travels is the first direction X. When the container W is transferred by the transfer device 24 to and from the housing rack 1 located on the second-direction first side Y1, the protruding/retracting direction A is the second direction Y (lateral direction U), and the width direction B is the first direction X. In this case, the second-direction first side Y1 is the protrusion side A1, and the second-direction second side Y2 is the retraction side A2. In the following description, it is assumed that the right side when facing the protrusion side A1 is a width-direction first side B1, and the left side when facing the protrusion side A1 is a width-direction second side B2 (see FIGS. 7, 16, etc.).

Figure 4:
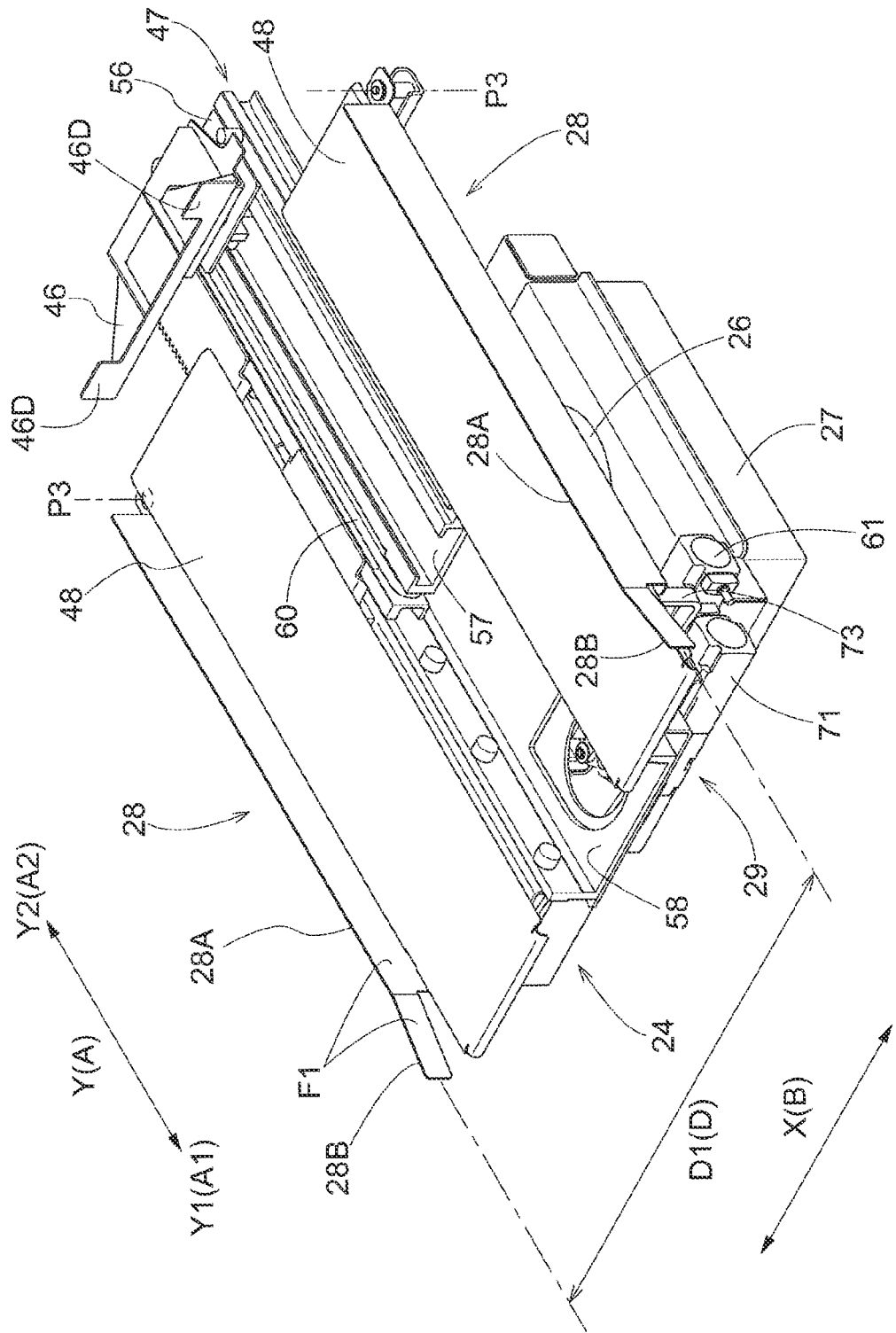
FIG. 4 is a perspective view of a transfer device and a pair of first guide portions at a first distance.

As shown in FIG. 4, the article transport vehicle 2 includes, in addition to the travel carriage 21 and the transfer device 24, a swiveling device 26 that swivels the transfer device 24 relative to the travel carriage 21, and an elevating body 27 that supports the transfer device 24 and the swiveling device 26 and that moves along the vertical direction Z. Furthermore, in the present embodiment, the article transport vehicle 2 includes the conveyor 23 (see FIGS. 2 and 3) that supports the containers W on the support region 22 in a stacked state, and a lifting mechanism 25 (see FIGS. 2 and 6) that lifts a container W at a given height included in the container group WG stacked on the support region 22, relative to a container W located therebelow. The conveyor 23 moves along the protruding/retracting direction A with the container group WG supported thereon, and the lifting mechanism 25 moves in the vertical direction Z along first masts 37.

Figure 9:
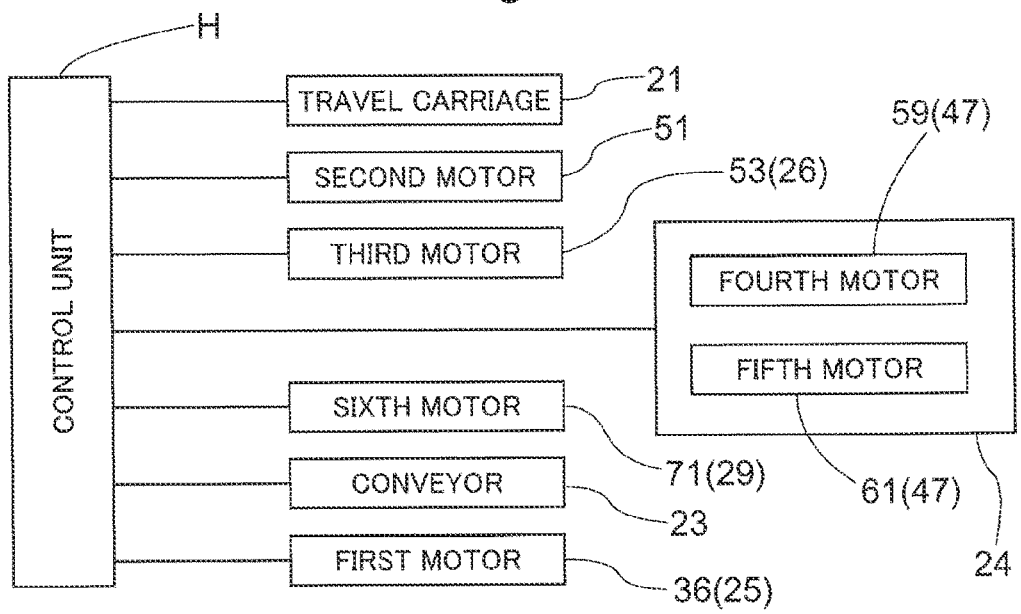
FIG. 9 is a control block diagram.

The article transport vehicle 2 further includes a pair of first guide portions 28 (see FIG. 3, etc.) that are located on opposite sides in the first direction X (width direction B) relative to the container W transferred by the transfer device 24, and that guide the container W in the second direction Y (protruding/retracting direction A), a guide driving device 29 (see FIGS. 4, 5, etc.) that changes the distance D between the two first guide portions 28 in the first direction X (width direction B), and a control unit H (see FIG. 9, etc.) that controls driving devices such as the guide driving device 29. Note that the control unit H controls a first motor 36 that drives the travel carriage 21, the conveyor 23, and the lifting mechanism 25, a second motor 51 that drives the elevating body 27, a third motor 53 that drives the swiveling device 26, a fourth motor 59 and a fifth motor 61 that constitute a transfer driving portion 47 that protrudes/retracts the engaging portion 46, and a sixth motor 71 that constitutes the guide driving device 29.

The conveyor 23 is installed so as to transport the container group WG along the second direction Y in a state in which the article transport vehicle 2 is located on the inter-rack passage 12 (the lateral direction U with respect to the article transport vehicle 2) (see FIG. 1). Accordingly, the container group WG in the loading portion 16 can be transported onto the conveyor 23 by operating the conveyor 23 in a state in which the article transport vehicle 2 is stopped such that the loading portion 16 is adjacent to the article transport vehicle 2 in the lateral direction U. In addition, the container group WG on the conveyor 23 can be transported to the unloading portion 18 by operating the conveyor 23 in a state in which the article transport vehicle 2 is stopped such that the unloading portion 18 is adjacent to the article transport vehicle 2 in the lateral direction U.

The elevating body 27 is moved in the vertical direction Z along second masts 52 according to driving of the second motor 51. The transfer device 24 is supported on the elevating body 27 via the swiveling device 26, and the transfer device 24 and the engaging portion 46 provided in the transfer device 24 are moved along the vertical direction Z as a result of the elevating body 27 being moved along the vertical direction Z. That is, the second motor 51 functions as a driving portion that elevates and lowers the engaging portion 46.

The swiveling device 26 swivels the transfer device 24 relative to the travel carriage 21 so as to change the protruding/retracting direction A of the engaging portion 46 as viewed in the vertical direction Z. In other words, the swiveling device 26 changes the directions of the protrusion side A1 and the retraction side A2 in the protruding/retracting direction A by swiveling the transfer device 24 relative to the travel carriage 21. In the present embodiment, the transfer device 24 is supported on the elevating body 27, as shown in FIG. 4. The swiveling device 26 is configured to swivel the transfer device 24 relative to the travel carriage 21 by swiveling the transfer device 24 relative to the elevating body 27 about a swivel axis P1 (see FIG. 3) extending along the vertical direction Z according to driving of the third motor 53.

By changing the directions of the protrusion side A1 and the retraction side A2 of the engaging portion 46 using the swiveling device 26, the state of the transfer device 24 is changed between a first rack transfer state (see FIG. 3) in which the protrusion side A1 is the second-direction first side Y1 and the retraction side A2 is the second-direction second side Y2, a second rack transfer state in which the protrusion side A1 is the second-direction second side Y2 and the retraction side A2 is the second-direction first side Y1, as a result of the transfer device 24 being rotated 180 degrees about the swivel axis P1 from the first rack transfer state, and a stacked transfer state in which the protrusion side A1 is the first-direction second side X2 and the retraction side A2 is the first-direction first side X1, as a result of the transfer device 24 being rotated 90 degrees about the swivel axis P1 from the first rack transfer state. The first rack transfer state is a state in which the container W is transferred to and from a housing rack 1 located on the second-direction first side Y1 relative to the article transport vehicle 2. The second rack transfer state is a state in which the container W is transferred to and from a housing rack 1 located on the second-direction second side Y2 relative to the article transport vehicle 2. The stacked transfer state is a state in which the container W is transferred to and from the support region 22. Note that it can be said that the protruding/retracting direction A is a direction extending along the lateral direction U of the article transport vehicle 2 in the first rack transfer state and the second rack transfer state, and that the protruding/retracting direction A is a direction extending along the front-rear direction V of the article transport vehicle 2 in the stacked transfer state.

When the direction extending along the traveling direction of the travel carriage 21 is inclined relative to the first direction X in a state in which the travel carriage 21 is stopped at a position adjacent to the housing rack 1 in the second direction Y, the transfer device 24 is swiveled by the swiveling device 26 such that the protruding/retracting direction A is parallel to the second direction Y. That is, the swiveling device 26 also serves the function of adjusting the displacement of the transfer device 24 about the swivel axis P1 in the protruding/retracting direction A.

Transfer Device

Figure 5:
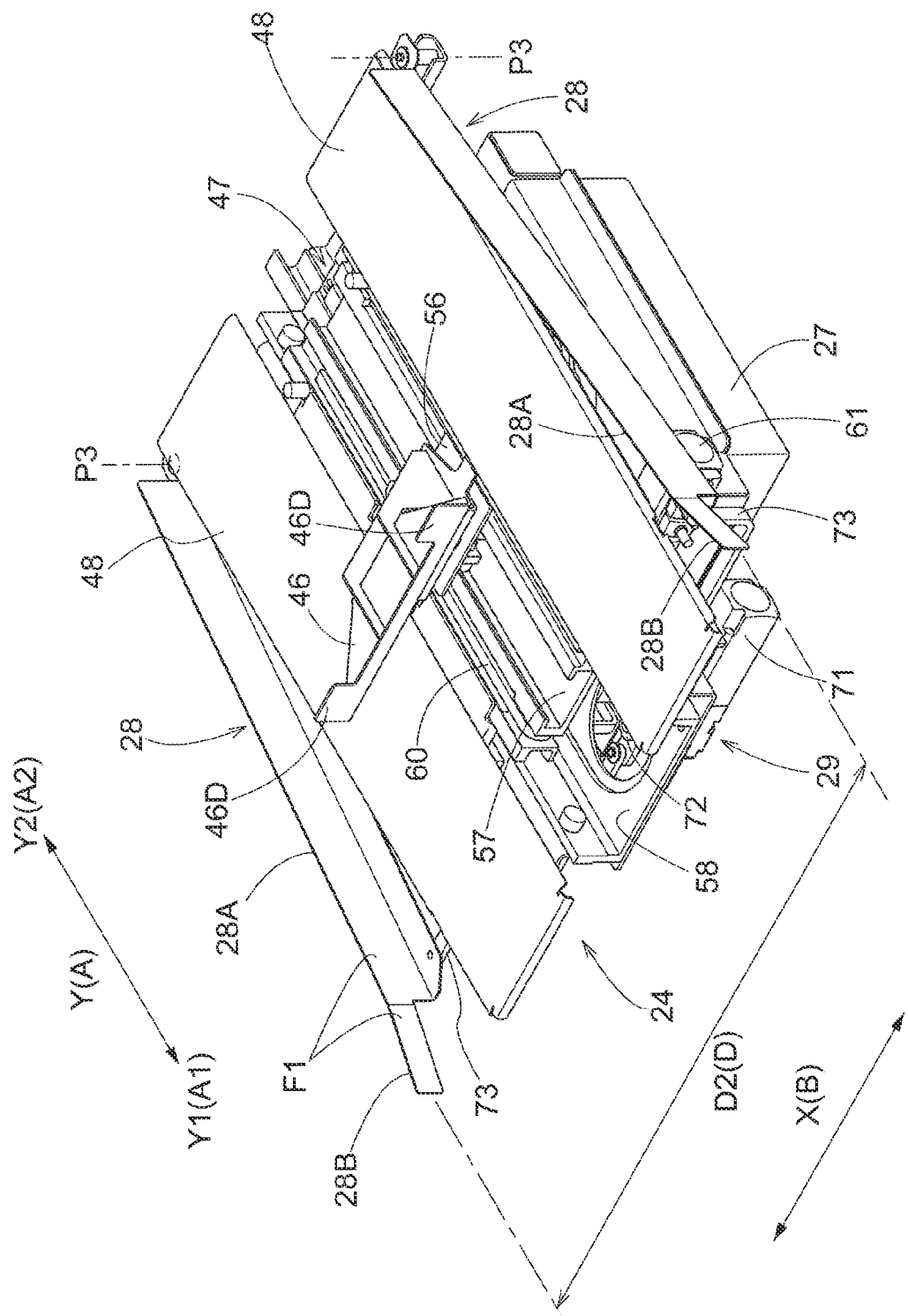
FIG. 5 is a perspective view of the transfer device and the pair of first guide portions at a second distance.

As shown in FIGS. 4 and 5, the transfer device 24 includes an engaging portion 46 serving as a contact portion that comes into contact with the container W, a transfer driving portion 47 that moves the engaging portion 46 along the protruding/retracting direction A, and support bodies 48 that support the bottom surface of the container W from below. The transfer device 24 transfers the container W from the transfer device 24 to the housing rack 1 by causing the transfer driving portion 47 to move the engaging portion 46 so as to protrude from a retracted position (see FIGS. 4 and 11) to a protruding position (see FIG. 15) along the protruding/retracting direction A. In addition, the transfer device 24 transfers the container W from the housing rack 1 to the transfer device 24 by causing the transfer driving portion 47 to move the engaging portion 46 so as to be retracted from the protruding position to the retracted position along the protruding/retracting direction A. Thus, the transfer device 24 transfers the container W between the transfer device 24 and the housing rack 1 by moving the engaging portion 46 so as to protrude or retract along the protruding/retracting direction A.

The transfer driving portion 47 includes a first protrusion/retraction portion 56 that supports the engaging portion 46, a second protrusion/retraction portion 57 that movably supports the first protrusion/retraction portion 56 along the protruding/retracting direction A, a base portion 58 that movably supports the second protrusion/retraction portion 57 along the protruding/retracting direction A, a fourth motor 59 (see FIG. 9) that moves the second protrusion/retraction portion 57 relative to the base portion 58 in the protruding/retracting direction A, and a protrusion/retraction interlocking portion 60 that moves the first protrusion/retraction portion 56 in conjunction with movement of the second protrusion/retraction portion 57. The transfer driving portion 47 is configured to move the second protrusion/retraction portion 57 to the protrusion side A1 relative to the base portion 58 according to driving of the fourth motor 59, whereby the first protrusion/retraction portion 56 is moved to the protrusion side A1 relative to the second protrusion/retraction portion 57 in conjunction with this movement of the second protrusion/retraction portion 57. In addition, the transfer driving portion 47 is configured to move the second protrusion/retraction portion 57 to the retraction side A2 relative to the base portion 58 according to driving of the fourth motor 59, whereby the first protrusion/retraction portion 56 is moved to the retraction side A2 relative to the second protrusion/retraction portion 57 in conjunction with this movement of the second protrusion/retraction portion 57.

The transfer driving portion 47 further includes a fifth motor 61 (see FIG. 9) that moves the base portion 58 relative to an elevation portion 32 along the protruding/retracting direction A. The transfer driving portion 47 moves the base portion 58 to the protrusion side A1 relative to the elevating body 27 according to driving of the fifth motor 61, and moves the first protrusion/retraction portion 56 to the protrusion side A1 according to driving of the fourth motor 59, thereby moving the engaging portion 46 to the protruding position. In addition, the transfer driving portion 47 moves the base portion 58 to the retraction side A2 relative to the elevating body 27 according to driving of the fifth motor 61, and moves the first protrusion/retraction portion 56 to the retraction side A2 according to driving of the fourth motor 59, thereby moving the engaging portion 46 to the retracted position. Also, the support bodies 48 are fixed to the base portion 58, and the transfer driving portion 47 moves the base portion 58 relative to the elevating body 27 along the protruding/retracting direction A according to driving of the fifth motor 61, thereby moving the support body 48 to the first position (see FIG. 11) and the second position (see FIG. 12) along the protruding/retracting direction A, together with the base portion 58. Note that the amount of movement of the support bodies 48 between the first position and the second position is smaller than the amount of movement of the engaging portion 46 between the retracted position and the protruding position.

Pivotal Support Portion

Figure 7:
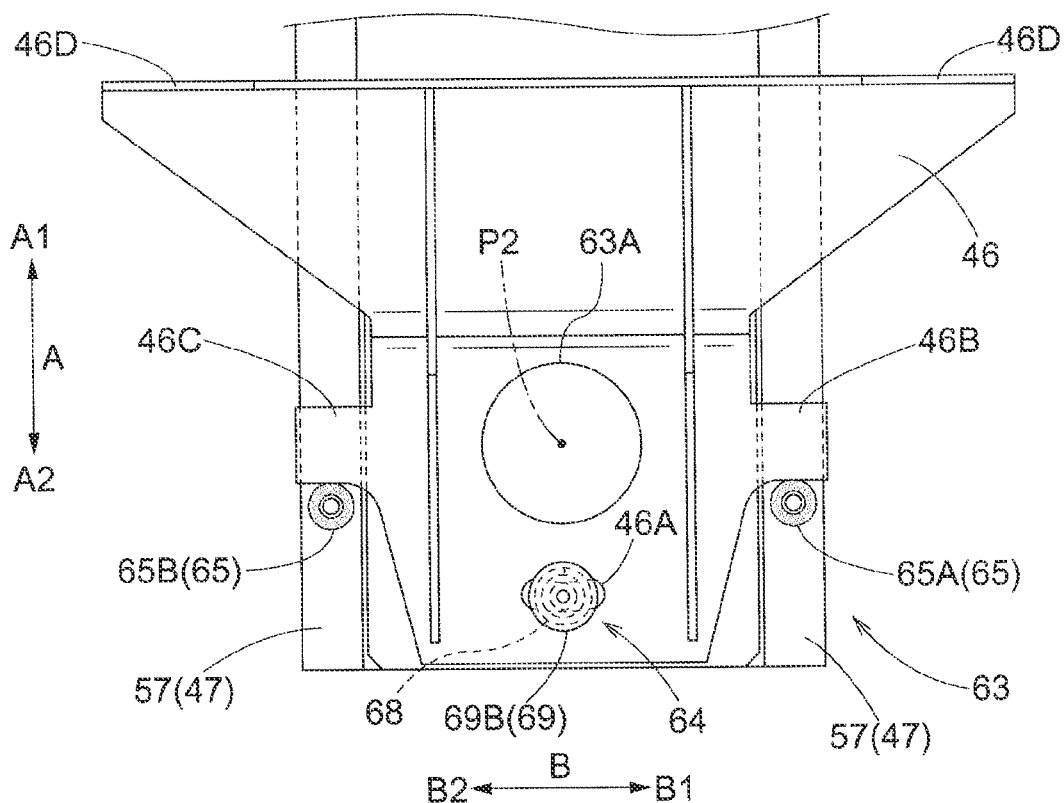
FIG. 7 is a plan view of an engaging portion and a pivotal support portion.
Figure 8:
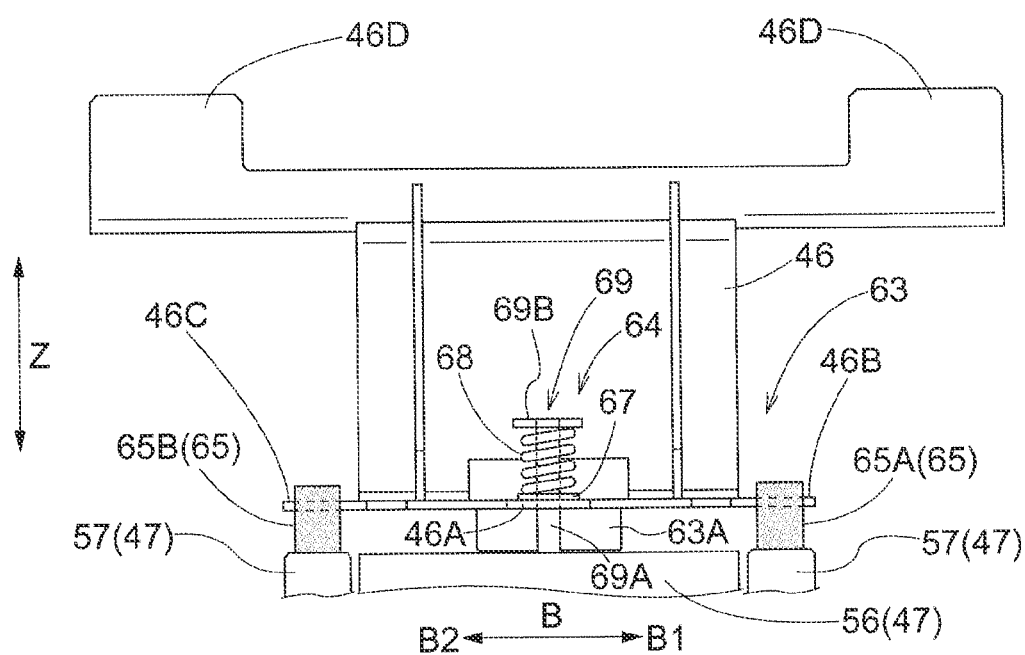
FIG. 8 is a rear view of the engaging portion and the pivotal support portion.

As shown in FIGS. 7 and 8, a pivotal support portion 63 that rotatably supports the engaging portion 46 about a rotation axis P2 extending along the vertical direction Z is provided at a connecting portion between the engaging portion 46 and the transfer driving portion 47.

In the present embodiment, the pivotal support portion 63 includes, in addition to a pivotal support portion body 63A that rotatably supports the engaging portion 46, a resistance portion 64 that provides rotational resistance to the relative rotation between the engaging portion 46 and the transfer driving portion 47, and a restoration operation portion 65 that restores the engaging portion 46 to a predetermined rotational phase. In the present example, the pivotal support portion 63 is provided at a connecting portion between the engaging portion 46 and the first protrusion/retraction portion 56.

The resistance portion 64 includes a contact member 67 that comes into contact with the engaging portion 46, a biasing member 68 that biases the contact member 67 in a direction to press the contact member 67 against the engaging portion 46, and a holding member 69 that holds the biasing member 68. In the present embodiment, the engaging portion 46 has an insertion hole 46A formed extending therethrough in the vertical direction Z. Also, the holding member 69 includes a bar-shaped portion 69A fixed to the first protrusion/retraction portion 56 and passed through the insertion hole 46A in the vertical direction Z, and an increased diameter portion 69B provided at an upper end portion of the bar-shaped portion 69A and expanding in a direction intersecting the vertical direction Z. The biasing member 68 formed by a coil spring is disposed in a compressed state between the increased diameter portion 69B of the holding member 69 and the contact member 67, and the contact member 67 is interposed between the biasing member 68 and the engaging portion 46. The resistance portion 64 provides rotational resistance to the engaging portion 46 by pressing the contact member 67 against the engaging portion 46 using the biasing force of the biasing member 68.

When the engaging portion 46 is displaced from a reference phase that is a reference position of the rotational phase about the rotation axis P2, the restoration operation portion 65 performs an operation to restore the rotational phase of the engaging portion 46 to the reference phase. In the present embodiment, if the engaging portion 46 is displaced from the reference phase when the engaging portion 46 has been moved from the protruding position to the retracted position, the restoration operation portion 65 comes into contact with the engaging portion 46, and restricts the orientation of the engaging portion 46 such that the rotational phase of the engaging portion 46 is brought into the reference phase. In the present embodiment, the restoration operation portion 65 is configured to come into contact with the engaging portion 46 from the retraction side A2. Here, the restoration operation portion 65 includes a first operation portion 65A and a second operation portion 65B. Also, the first operation portion 65A abuts against, from the retraction side A2, a first operated portion 46B of the engaging portion 46 that is located on the width-direction first side B1 relative to the rotation axis P2. The second operation portion 65B abuts against, from the retraction side A2, a second operated portion 46C of the engaging portion 46 that is located on the width-direction second side B2 relative to the rotation axis P2.

Figure 16:
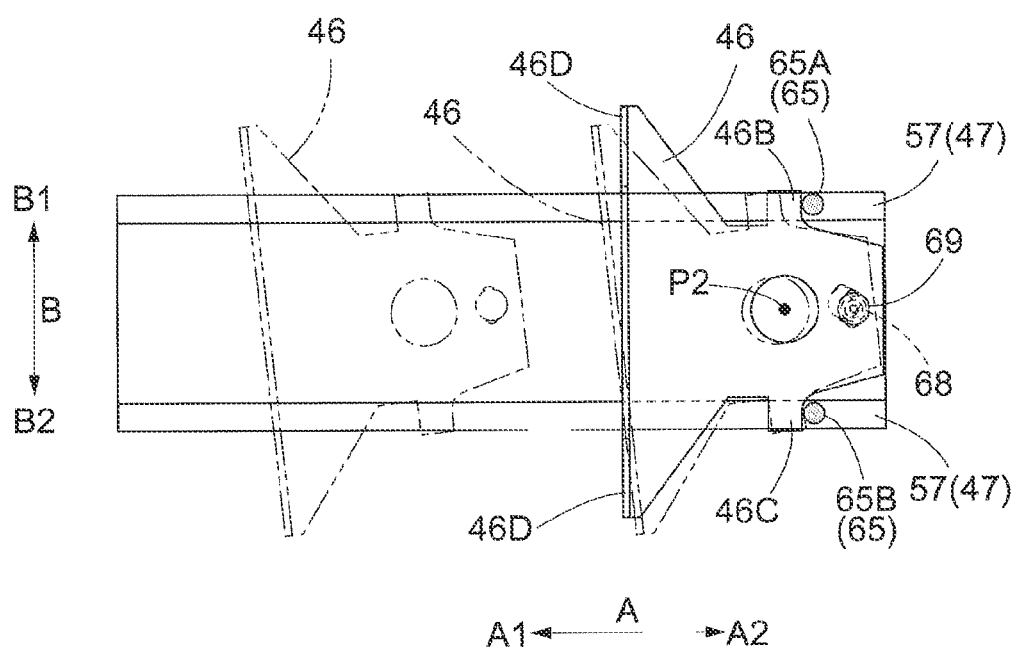
FIG. 16 is a plan view showing a restoration operation of the engaging portion.

For example, as indicated by the virtual line in FIG. 16, when the rotational phase of the engaging portion 46 is displaced counterclockwise from the reference phase in a plan view, the second operation portion 65B abuts against the second operated portion 46C from the retraction side A2, thereby rotating the engaging portion 46 clockwise so as to be restored to the reference phase. Although not shown, when the rotational phase of the engaging portion 46 is displaced clockwise from the reference phase in a plan view, the first operation portion 65A abuts against the first operated portion 46B from the retraction side A2, thereby rotating the engaging portion 46 counterclockwise so as to be restored to the reference phase.

Thus, if the rotational phase of the engaging portion 46 is displaced from the reference phase when the engaging portion 46 has been moved from the protruding position to the retracted position, the restoration operation portion 65 restores the rotational phase of the engaging portion 46 to the reference phase by abutting the first operation portion 65A or the second operation portion 65B against the engaging portion 46 from the retraction side A2. In the present embodiment, engaging end portions 46D that engage with the engaged portion 5 of the container W, of the engaging portion 46, are formed in a plate shape extending along the vertical direction Z, and the reference phase is a phase in which the engaging end portions 46D are parallel to the width direction B.

First Guide Portions

As shown in FIGS. 4 and 5, the two first guide portions 28 are configured such that the distance D therebetween can be changed between a first distance D1 (see FIG. 4) corresponding to the distance (housing portion width E) in the width direction B (first direction X) between the two second guide portions 14, and a second distance D2 (see FIG. 5) wider than the first distance D1. In the present embodiment, each of the two first guide portions 28 is configured to swing about a swing axis P3 extending along the vertical direction Z, and this swinging changes the distance D between the first distance D1 and the second distance D2. The swing axis P3 is disposed on the retraction side A2 relative to a guide center position, which is a center position of the first guide portion 28 in the protruding/retracting direction A. Therefore, the distance D is changed to the second distance D2 when end portions on the protrusion side A1 of the pair of first guide portions 28 swing in a direction away from each other about the swing axes P3, and the distance D is changed to the first distance D1 when the end portions on the protrusion side A1 of the pair of first guide portions 28 swing in a direction toward each other about the swing axes P3. In the present embodiment, the swing axis P3 is disposed at an end portion on the retraction side A2 of each of the first guide portions 28 in the protruding/retracting direction A. Accordingly, even when the pair of first guide portions 28 swing, the distance between the respective end portions on the retraction side A2 of the first guide portions 28 is maintained.

Each of the two first guide portions 28 includes the first parallel portion 28A and the first inclined portion 28B as portions constituting a first guide surface F1 that guides the container W. The first parallel portions 28A constitute portions of the first guide surfaces F1 that extend along a direction parallel to the protruding/retracting direction A in a state in which the distance D between the two first guide portions 28 is the first distance D1. The first inclined portions 28B constitute portions of the first guide surfaces F1 that are inclined so as to extend along a direction in which the first inclined portions 28B separate from each other in the width direction B toward the protrusion side A1 in a state in which the distance D between the two first guide portions 28 is the first distance D1. Each of the first inclined portions 28B is provided at an end portion on the protrusion side A1 of the corresponding first guide portions 28 so as to be continuous with the corresponding first parallel portion 28A on the protrusion side A1 relative to the first parallel portion 28A. In the present embodiment, in a state in which the distance D between the two first guide portions 28 is the first distance D1, portions of the first guide surfaces F1 that oppose each other at the pair of first parallel portions 28A are oriented to be parallel to each other, and to be parallel to the protruding/retracting direction A. In a state in which the distance D between the two first guide portions 28 is the second distance D2, portions of the first guide surfaces F1 at the pair of first parallel portions 28A are oriented to be inclined relative to the protruding/retracting direction A so as to be spaced apart from each other toward the protrusion side A1.

The guide driving device 29 is coupled to on the protrusion side A1 relative to the guide center position of the pair of first guide portions 28. More specifically, as shown in FIGS. 4, 5, and 15, the guide driving device 29 includes a sixth motor 71, a rotational body 72 that is rotated according to driving of the sixth motor 71, and a pair of link bodies 73 coupled to the rotational body 72. The pair of link bodies 73 have proximal end portions coupled to the rotational body 72, and distal end portions coupled to portions of the first guide portions 28 that are located on the protrusion side A1 relative to the guide center position. The guide driving device 29 is configured to rotate the rotational body 72 according to driving of the sixth motor 71 to extend the pair of link bodies 73 along the width direction B, thereby pushing the pair of first guide portions 28 to sides where they are spaced apart from each other (outward in the width direction B), and to retract the pair of link bodies 73 along the width direction B to pull the pair of first guide portions 28 to sides where they move closer to each other (inward in the width direction B), thereby swinging the pair of first guide portions 28 about the swing axes P3 serving as supporting points.

Note that FIGS. 4 and 5 illustrate the distance D between the two first guide portions 28 with respect to end portions on the protrusion side A1 of the two first guide portions 28. As described above, each of the first guide portions 28 includes the first parallel portion 28A and the first inclined portion 28B as portions constituting the first guide surface F1 that guides the container W. The first parallel portions 28A extend along a direction parallel to the protruding/retracting direction A in a state in which the distance D between the two first guide portions 28 is the first distance D1. On the other hand, the first inclined portions 28B are inclined so as to extend along a direction in which the first inclined portions 28B separate from each other in the width direction B toward the protrusion side A1 in a state in which the distance D between the two first guide portions 28 is the first distance D1. In the configuration illustrated in FIGS. 4 and 5, the distance D between the two first guide portions 28 is defined with respect to the end portions on the protrusion side A1 side of the first inclined portions 28B. However, the distance D between the two first guide portions 28 may be defined with respect to end portions on the protrusion side A1 (boundaries between the first parallel portions 28A and the first inclined portions 28B) of the first parallel portions 28A.

Lifting Mechanism

As shown in FIG. 6, the lifting mechanism 25 includes support portions 31 that support the container W, an elevation portion 32 that supports the support portions 31 and moves along the vertical direction Z, and third guide portions 33 that guide the container W. The elevation portion 32 is moved according to driving of the first motor 36 (see FIG. 9) in the vertical direction Z along the first masts 37 (see FIG. 2) provided standing upright on the travel carriage 21.

As described above, the support portions 31 support the container W by abutting against the protruding portions 6 of the container W from below. The third guide portions 33 guide the side wall portion 40 of the container W when the support portions 31 support the container W. The support portions 31 are configured such that the orientations thereof can be changed between a support position (see FIG. 6) at which the support portions 31 overlap the protruding portions 6 of the container W located in the support region 22 as viewed in the vertical direction Z, and a withdrawal position (not shown) at which the support portions 31 do not overlap the container W located in the support region 22 as viewed in the vertical direction Z. The support portions 31 are pivoted by the driving portion 44 constituted by a motor or the like, and the orientation thereof is changed between the support position at which distal end portions of the support portions 31 face the lateral direction U as shown in FIG. 6, and the withdrawal position (not shown) at which the distal end portions of the support portions 31 face the vertical direction Z. Although not shown in FIG. 9, the driving portion 44 is also controlled by the control unit H. By setting the support portions 31 to the withdrawal position, the lifting mechanism 25 can prevent the support portions 31 from coming into contact with the container group WG located in the support region 22 when moving the elevation portion 32 in the vertical direction Z.

Also, the lifting mechanism 25 moves the support portions 31 from the withdrawal position to the support position in a state in which the elevation portion 32 has been moved to the height corresponding to a given container W in the container group WG located in the support region 22, and thereafter raises the elevation portion 32. Consequently, the support portions 31 engage with the protruding portions 6 of the given container W, and the given container W can be lifted. At this time, when any other container W is stacked above the given container W, the container W stacked above the given container W can be lifted together with the given container W. Thus, the lifting mechanism 25 can lift a given container W in the container group WG stacked in the support region 22, as well as any container W stacked above the given container W.

Thus, in a state in which a given container W and the container W located above the given container W are lifted together by the lifting mechanism 25, it is possible to cause the transfer device 24 in the stacked transfer state to transfer the containers W from the transfer device 24 to the support region 22, and also to transfer the containers W from the support region 22 to the transfer device 24. In the state of lifting the containers W, the lifting mechanism 25 can unload the containers W onto the conveyor 23 when no container W is present in the support region 22. When a container W is present in the support region 22, the lifting mechanism 25 can unload the containers W so as to be stacked on that container W.

Control Unit

The control unit H performs housing control to transfer a container W from the transfer device 24 to the housing rack 1 so as to house the container W in the housing rack 1, and retrieval control to transfer a container W from the housing rack 1 to the transfer device 24 so as to retrieve the container W from the housing rack 1.

Figure 13:
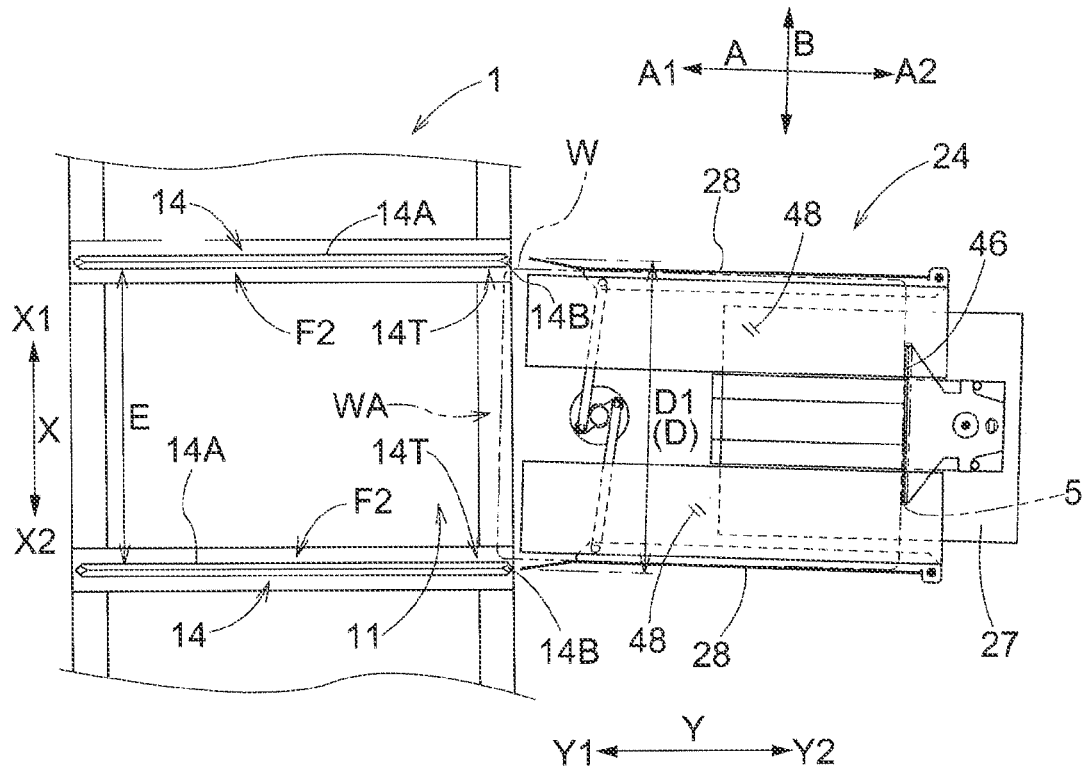
FIG. 13 is a plan view showing a start state in which the pair of first guide portions start changing from the first distance to the second distance.

The control unit H controls the guide driving device 29 so as to change the distance D between the two first guide portions 28 in the width direction B from the first distance D1 to the second distance D2 during a period from start to completion of movement of the engaging portion 46 from the retracted position to the protruding position in the housing control. In the present embodiment, the control unit H controls the guide driving device 29 so as to change the distance D between the two first guide portions 28 in the width direction B from the first distance D1 to the second distance D2 after a rack-side end portion WA, which is an end portion on the protrusion side A1 (housing rack side), of the container W being transferred by the transfer device 24 has been brought into a state of being guided by the second guide portions 14. More particularly, as shown in FIG. 13, the control unit H controls the guide driving device 29 so as to start changing the distance D between the two first guide portions 28 in the width direction B from the first distance D1 to the second distance D2 when the engaging portion 46 has been brought into a start state in which the rack-side end portion WA of the container W being transferred by the transfer device 24 and transfer device-side end portions 14T, which are end portions on the retraction side A2 (end portions on the transfer device 24 side), of the second parallel portions 14A of the second guide portions 14 are at the same position in the protruding/retracting direction A.

The control unit H controls the guide driving device 29 so as to change the distance D between the two first guide portions 28 in the width direction B from the second distance D2 to the first distance D1 during a period from start to completion of movement of the engaging portion 46 from the protruding position to the retrieval control in the retracted position. In the present embodiment, the control unit H controls the guide driving device 29 so as to start changing the distance D between the two first guide portions 28 in the width direction B from the second distance D2 to the first distance D1 when the engaging portion 46 has been brought into the above-described start state (see FIG. 13) during a period from start to completion of movement of the engaging portion 46 from the protruding position to the retracted position.

In the present embodiment, the amount of movement of the engaging portion 46 in the protruding/retracting direction A until the engaging portion 46 has been brought into the start state from the retracted position, and the amount of movement of the engaging portion 46 in the protruding/retracting direction A until the engaging portion 46 has been brought into the start state from the protruding position are set in advance. Therefore, as a reference position to start changing the distance D between the two first guide portions 28 in the width direction B from the first distance D1 to the second distance D2, an opening change start position, which is a position of the engaging portion 46 in the protruding/retracting direction A, can be set in advance. Similarly, as a reference position to start changing the distance D between the two first guide portions 28 in the width direction B from the second distance D2 to the first distance D1, a closing change start position, which is a position of the engaging portion 46 in the protruding/retracting direction A, can be set in advance.

The control unit H controls the guide driving device 29 so as to start changing the distance D between the two first guide portions 28 in the width direction B from the first distance D1 to the second distance D2, if it is determined that the position of the engaging portion 46 in the protruding/retracting direction A has reached the opening change start position during a period from start to completion of movement of the engaging portion 46 from the retracted position to the protruding position. The control unit H controls the guide driving device 29 so as to start changing the distance D between the two first guide portions 28 in the width direction B from the second distance D2 to the first distance D1, if it is determined that the position of the engaging portion 46 in the protruding/retracting direction A has reached the closing change start position during a period from start to completion of movement of the engaging portion 46 from the protruding position to the retracted position.

Thus, the control unit H controls the guide driving device 29 so as to change the distance between the two first guide portions 28 in conjunction with movement of the engaging portion 46 in the protruding/retracting direction A. Note that, in the present embodiment, the opening change start position and the closing change start position are positions at which the engaging portion 46 is present in a state in which the rack-side end portion WA of the container W and the transfer device-side end portions 14T, which are end portions on the retraction side A2, of the second parallel portions 14A of the second guide portions 14 are at the same position in the protruding/retracting direction A, as shown in FIG. 13.

Figure 10:
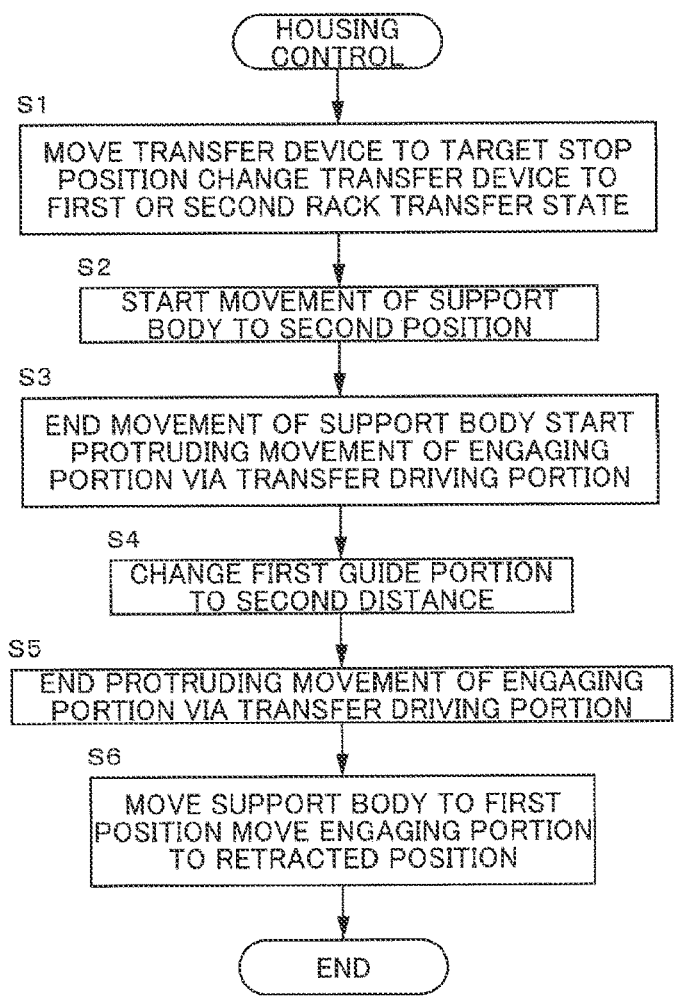
FIG. 10 is a control flowchart of the transfer device.
Figure 11:
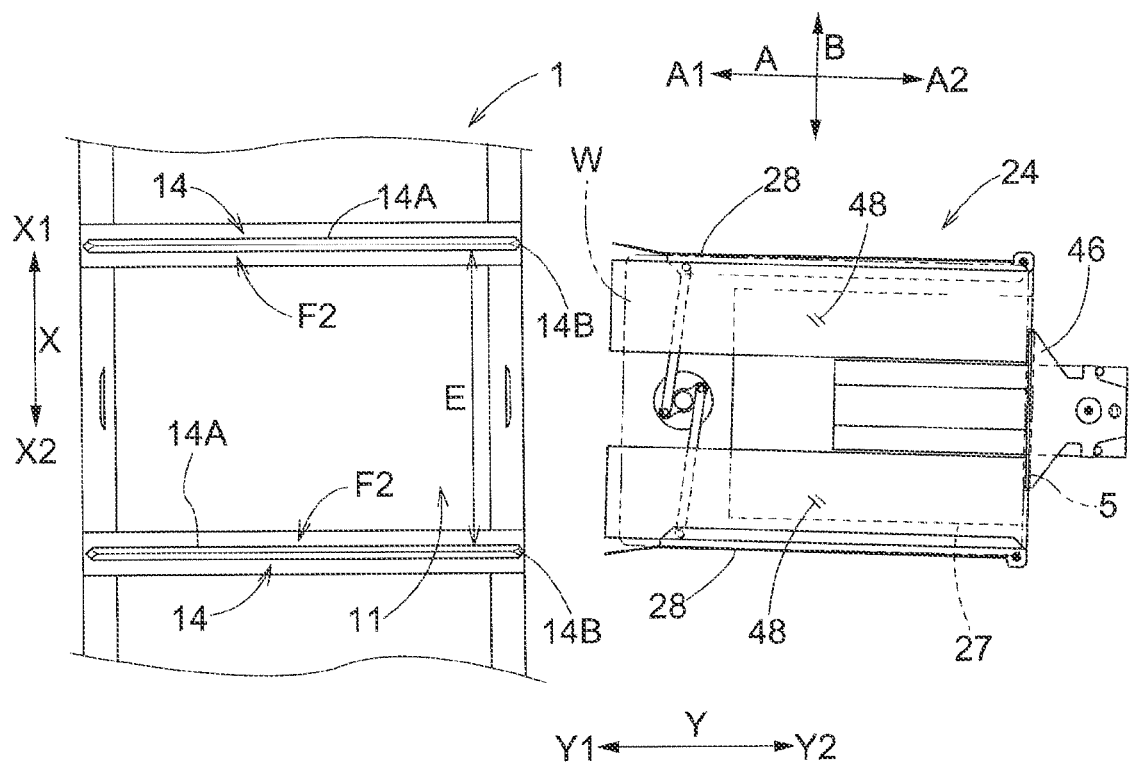
FIG. 11 is a plan view showing a state in which the engaging portion is at a retracted position and a support body is at a first position.
Figure 12:
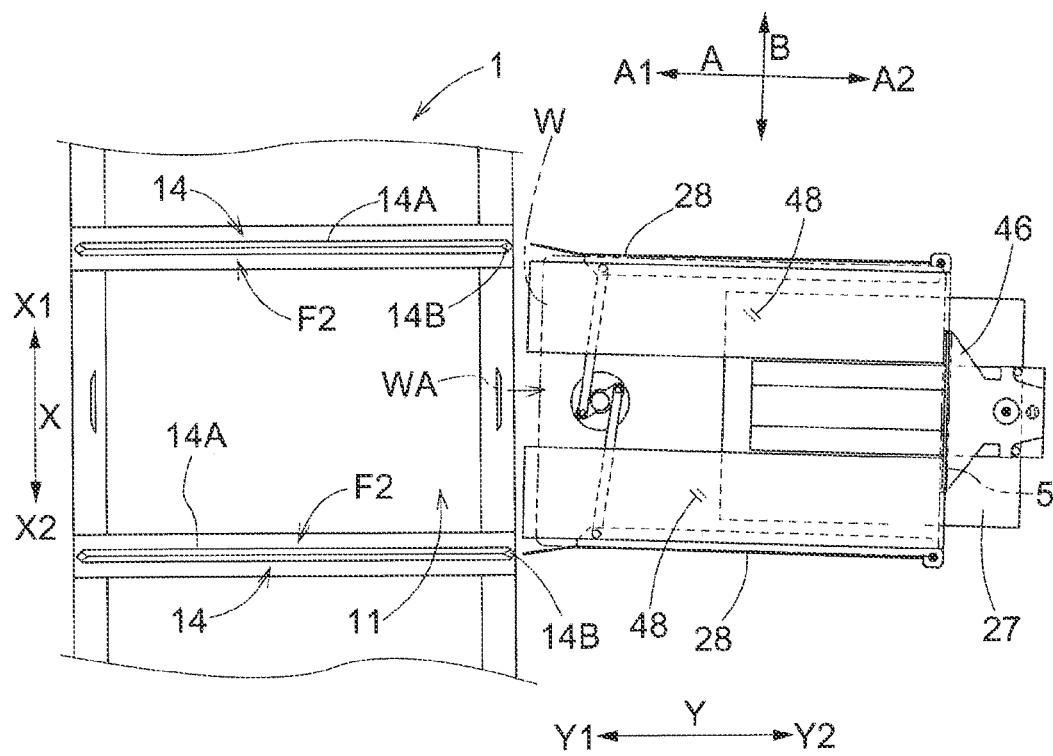
FIG. 12 is a plan view showing a state in which the support body is at a second position.

The housing control performed by the control unit H will be described with reference to the flowchart of the housing control shown in FIG. 10, and the diagrams illustrating operations in FIGS. 11 to 15. When the housing control is performed, the engaging portion 46 is at the retracted position, the support bodies 48 are at the first position, and the pair of first guide portions 28 are at the first distance D1, as shown in FIG. 11.

In the housing control, the control unit H first controls the travel carriage 21 and the elevating body so as to move the transfer device 24 to a target stop position corresponding to the position of the housing rack 1 to which the container W is to be housed, and controls the swiveling device 26 such that the transfer device 24 is brought into the first rack transfer state or the second rack transfer state (S1). Next, the movement of the support bodies 48 from the first position to the second position by the transfer driving portion 47 is started (S2). Thereafter, the control unit H ends the movement of the support bodies 48 as the support bodies 48 have reached the second position shown in FIG. 12 (S3). Upon the end of this movement of the support bodies 48, the control unit H starts protruding movement of the engaging portion 46 via the transfer driving portion 47 (S3).

Figure 14:
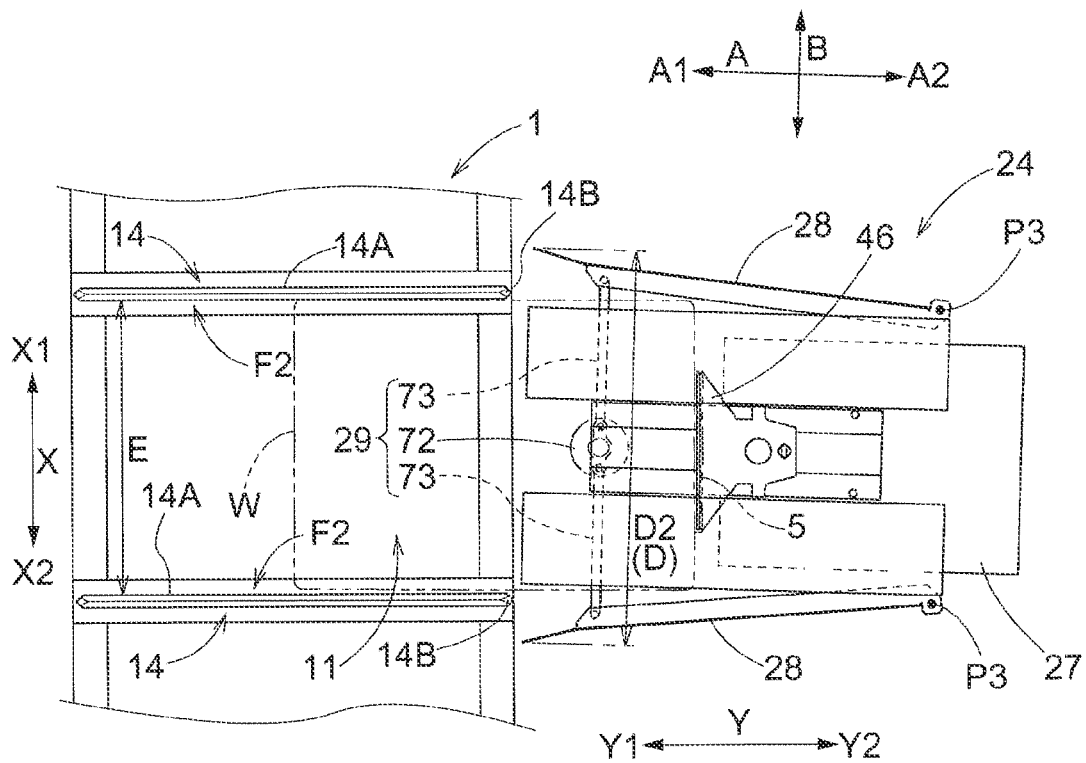
FIG. 14 is a plan view showing a state in which the pair of first guide portions have changed to the second distance.

Then, the control unit H changes the distance D between the two first guide portions 28 in the width direction B from the first distance D1 to the second distance D2 during a period from the start of protruding movement of the engaging portion 46 via the transfer driving portion 47 to the end of the protruding movement (S4). Specifically, as shown in FIG. 13, the control unit H starts changing the distance D between the two first guide portions 28 in the width direction B from the first distance D1 to the second distance D2 when the rack-side end portion WA of the container W and the transfer device-side end portions 14T of the second parallel portions 14A of the second guide portions 14 are at the same position in the protruding/retracting direction A. Then, as shown in FIG. 14, the distance D between the two first guide portions 28 in the width direction B is changed to the second distance D2 while the engaging portion 46 and the container W are moved.

Thereafter, as shown in FIG. 15, the control unit H ends the protruding movement of the engaging portion 46 via the transfer driving portion 47 in conjunction with engaging portion 46 moving to the protruding position (S5). Consequently, the container W is housed in the housing rack 1. Then, after this, the control unit H causes the elevation portion 32 to be lowered, and causes the engagement of the engaging portion 46 with the engaged portion 5 to be released. Thereafter, the control unit H causes the transfer driving portion 47 to move the support bodies 48 from the second position to the first position, and also to move the engaging portion 46 from the protruding position to the retracted position (S6).

In the retrieval control, the control unit H controls the travel carriage 21 and the elevating body 27 so as to move the transfer device 24 to the target stop position corresponding to the position in the housing rack 1 at which the container W is to be housed, and controls the swiveling device 26 such that the transfer device 24 is brought into the first rack transfer state or the second rack transfer state. Thereafter, the control unit H performs the housing control in the reversed order to transfer the container W from the housing rack 1 to the transfer device 24. When the container W is transferred between the transfer device 24 and the support region 22 by the transfer device 24, the transfer device 24 is operated in the same manner as in the case of transferring the container W between the transfer device 24 and the housing rack 1 except that the state of the transfer device 24 is changed to the stacked transfer state, and therefore descriptions thereof will be omitted.

2. Other Embodiments

Next, other embodiments of the article transport vehicle will be described.

(1) The above embodiment was described, taking, as an example, a configuration in which the distance between the two first guide portions 28 in the width direction B is changed between the first distance and the second distance by swinging the pair of first guide portions 28 about the swing axes P3 extending along the vertical direction Z. However, the configuration for changing the distance between the two first guide portions 28 in the width direction B may be modified as appropriate. For example, the distance between the two first guide portions 28 in the width direction B may be changed by slidably moving both of the two first guide portions 28 in the width direction B. The distance between the two first guide portions 28 in the width direction B may also be changed from the first distance to the second distance by swinging both of the two first guide portions 28 about an axis extending along the protruding/retracting direction A so as to collapse outward in the width direction B.

(2) The above embodiment was described, taking, as an example, a configuration in which the article transport vehicle 2 includes the swiveling device 26, and the protruding/retracting direction A of the engaging portion 46 is changeable. However, for example, when the housing rack 1 is installed on only one side in the first direction X relative to the article transport vehicle 2, or when the engaging portion 46 can protrude to both the first-direction first side X1 and the first-direction second side X2, it is possible to adopt a configuration in which the article transport vehicle 2 does not include the swiveling device 26.

(3) The above embodiment was described, taking, as an example, a configuration in which the engaging end portions 46D that engage with the engaged portion 5 of the engaging portion 46 are formed in a plate shape; however, the shape of the engaging end portions 46D may be changed as appropriate. For example, the shape of the engaging end portions 46D may be a different shape such as a bar shape extending in the vertical direction Z.

(4) The above embodiment was described, taking, as an example, a configuration in which the pivotal support portion 63 is provided at the connecting portion between the engaging portion 46 and the transfer driving portion 47, and the engaging portion 46 is rotatably connected to the transfer driving portion 47. However, the configuration of the connecting portion between the engaging portion 46 and the transfer driving portion 47 may be changed as appropriate. For example, it is possible to adopt a configuration in which the engaging portion 46 is fixed so as not to rotate about the rotation axis P2 extending along the vertical direction Z, without providing the pivotal support portion 63 at the connecting portion between the engaging portion 46 and the transfer driving portion 47. When the pivotal support portion 63 is provided at the connecting portion between the engaging portion 46 and the transfer driving portion 47, it is possible to adopt a configuration in which an elastic body that biases the engaging portion 46 such that the rotational phase of the engaging portion 46 is elastically restored to the reference phase is provided in place of the resistance portion 64.

(5) In the above embodiment, the control unit H is configured to change the distance between the two first guide portions 28 according to the amount of movement of the engaging portion 46 in the protruding/retracting direction A, and the distance between the two first guide portions 28 is changed in conjunction with the movement of the engaging portion 46 in the protruding/retracting direction A. However, the distance between the two first guide portions 28 does not need to be changed in conjunction with the movement of the engaging portion 46 in the protruding/retracting direction A. For example, it is possible to adopt a configuration in which a sensor for detecting the position of the container W or the engaging portion 46 is provided, and the distance between the two first guide portions 28 is changed in response to the position of the container W or the engaging portion 46 becoming a predetermined position, based on the information detected by the sensor.

(6) The above embodiment was described, taking, as an example, a configuration in which the distance between the two first guide portions 28 is changed under control of the control unit H in conjunction with the movement of the engaging portion 46 in the protruding/retracting direction A. However, the present invention is not limited thereto, and it is also preferable to adopt a configuration in which the transfer device 24 includes an interlocking mechanism that mechanically interlocks the movement of the engaging portion 46 in the protruding/retracting direction A and the change in the distance between the two first guide portions 28. Such an interlocking mechanism can be formed, for example, using a gear mechanism, a cam mechanism, a link mechanism, or the like. Also, the interlocking mechanism may be configured to drive the pair of first guide portions 28 such that, in conjunction with an operation of moving the engaging portion 46 from the retracted position to the protruding position via the transfer driving portion 47, the distance between the two first guide portions 28 in the width direction B is changed from the first distance to the second distance during a period from start to completion of the aforementioned movement.

(7) The above embodiment was described, taking, as an example, a configuration in which the distance between the two first guide portions 28 in the width direction B is changed from the second distance to the first distance during a period from start to completion of movement of the engaging portion 46 from the protruding position to the retracted position in the retrieval control. However, the timing for changing the distance between the two first guide portions 28 in the width direction B in the retrieval control is not limited to during movement of the engaging portion 46. For example, it is possible to adopt a configuration in which the distance between the two first guide portions 28 in the width direction B is changed from the second distance to the first distance after the engaging portion 46 has been moved from the protruding position to the retracted position.

(8) The above embodiment was described, taking, as an example, a configuration in which the contact portion that comes into contact with the container W serving as an article is the engaging portion 46 that engages with the engaged portion 5 of the container W. However, the configuration of the contact portion of the transfer device 24 is not limited thereto. For example, the contact portion of the transfer device 24 may be a fork or the like that moves the article in the protruding/retracting direction A while scooping up and supporting the bottom surface of the article from below. Alternatively, the contact portion of the transfer device 24 may be a pressing portion that presses a side surface on the retraction side A2 side or the protrusion side A1 of the article to move the article in the protruding/retracting direction A.

(9) Note that the configurations disclosed in the embodiments described above are applicable in combination with configurations disclosed in other embodiments as long as no inconsistency arises. With regard to the other configurations as well, the embodiments disclosed herein are illustrative in all respects. Therefore, various modifications and alterations may be made as appropriate without departing from the gist of the present disclosure.

3. Outline of the Embodiment

An outline of the article transport vehicle described above will be described below.

The article transport vehicle includes: a travel carriage that travels along a housing rack that houses an article; and a transfer device that is installed on the travel carriage and that transfers an article to the housing rack by moving a contact portion that comes into contact with an article such that the contact portion protrudes from a retracted position to a protruding position along a protruding/retracting direction, wherein, assuming that a width direction is a direction orthogonal to the protruding/retracting direction in a vertical view along a vertical direction, the article transport vehicle further includes: a pair of first guide portions that are located on opposite sides in the width direction relative to an article being transferred by the transfer device and that guide the article in the protruding/retracting direction; a guide driving device that changes a distance between the two first guide portions in the width direction; and a control unit that controls the guide driving device, and the control unit controls the guide driving device so as to increase the distance between the two first guide portions in the width direction during a period from start to completion of movement of the contact portion from the retracted position to the protruding position.

With this configuration, the distance between the two first guide portions in the width direction is not increased until partway through the movement of the contact portion from the retracted position to the protruding position. Accordingly, when an article is transferred from the transfer device to the housing rack, the article can be appropriately guided in the protruding/retracting direction by the pair of first guide portions. Also, after partway through the movement of the contact portion from the retracted position to the protruding position, the distance between the two first guide portions in the width direction is increased. Accordingly, the restriction imposed by the first guide portions on the movement of the article in the width direction is reduced. This makes it possible to prevent the article from being caught between the housing rack and the first guide portions even if the article is moved in the width direction by the housing rack, for example, when the stop position of the travel carriage relative to the housing rack is displaced in the width direction. Therefore, it is possible to appropriately transfer the article even when the displacement of the transfer device relative to the housing rack in the width direction is relatively large.

Here, it is preferable that the article transport vehicle further includes a swiveling device that swivels the transfer device relative to the travel carriage so as to change the protruding/retracting direction of the contact portion in the vertical view.

With this configuration, the article can be transferred to and from housing racks located in different directions by changing the protruding/retracting direction of the transfer device. Even when the inclination of the travel carriage relative to the housing rack is relatively large, the protruding/retracting direction of the contact portion can be matched to the direction of the housing rack by swiveling the transfer device using the swiveling device, thus making it possible to appropriately transfer the article. The displacement of the rotational phase of the transfer device relative to the housing rack may remain even after the transfer device has been swiveled using the swiveling device. However, with this configuration, even when the article is moved in the width direction by the housing rack, the restriction imposed by the first guide portions on the movement of the article in the width direction is reduced after partway through the movement of the contact portion from the retracted position to the protruding position. Accordingly, it is possible to prevent the article from being caught between the housing rack and the first guide portions. Therefore, the article can be appropriately transferred even when the displacement of the rotational phase of the transfer device relative to the housing rack is relatively large.

It is preferable that the housing rack includes a pair of second guide portions that are located on opposite sides in the width direction relative to an article being transferred by the transfer device and that guide the article in the protruding/retracting direction, the guide driving device is configured to change the distance between the two first guide portions in the width direction between a first distance corresponding to a distance between the two second guide portions in the width direction, and a second distance wider than the first distance, and the control unit controls the guide driving device so as to change the distance between the two first guide portions in the width direction from the first distance to the second distance during a period from start to completion of movement of the contact portion from the retracted position to the protruding position.

With this configuration, by providing the second guide portions in the housing rack, an article can be guided by the first guide portions and the second guide portions when the article is transferred from the transfer device to the housing rack. Even when the article is moved in the width direction by the action of the second guide portions as a result of the stop position of the travel carriage relative to the housing rack being displaced in the width direction, the distance between the two first guide portions in the width direction becomes greater than the distance corresponding to the distance between the two second guide portions in the width direction after partway through the movement of the contact portion from the retracted position to the protruding position, and the restriction imposed by the first guide portions on the movement of the article in the width direction is reduced. Accordingly, it is possible to prevent the article from being caught between the first guide portions and the second guide portions, thus making it possible to appropriately transfer the article even when the displacement of the transfer device relative to the housing rack in the width direction is relatively large.

It is preferable that the control unit controls the guide driving device so as to change the distance between the two first guide portions in the width direction from the first distance to the second distance after a rack-side end portion, which is an end portion on the housing rack side, of an article being transferred by the transfer device has been brought into a state of being guided by the second guide portions.

With this configuration, an article can be continuously guided by the first guide portions and the second guide portions when the article is transferred from the transfer device to the housing rack. Since the restriction is reduced by increasing the distance between the two first guide portions in the width direction after the article has been brought into a state of being guided by the second guide portions, it is also possible to appropriately prevent the article from being caught between the first guide portions and the second guide portions. Therefore, even when the displacement of the transfer device relative to the housing rack in the width direction is relatively large, the article can be transferred while being appropriately guided by the first guide portions and the second guide portions.

It is preferable that the transfer device is further configured to transfer an article from the housing rack to the transfer device by moving the contact portion so as to be retracted from the protruding position to the retracted position along the protruding/retracting direction, and the control unit controls the guide driving device so as to change the distance between the two first guide portions in the width direction from the second distance to the first distance during a period from start to completion of movement of the contact portion from the protruding position to the retracted position, or controls the guide driving device so as to change the distance between the two first guide portions in the width direction from the second distance to the first distance upon completion of movement of the contact portion from the protruding position to the retracted position.

With this configuration, until partway through the movement of the contact portion from the protruding position to the retracted position, or until completion of the movement of the contact portion, the distance between the two first guide portions in the width direction is the second distance. Accordingly the restriction imposed by the first guide portions on the movement of the article in the width direction is reduced. Therefore, it is possible to prevent the article from being caught between the housing rack and the first guide portions, thus making it possible to appropriately transfer the article even when the displacement of the transfer device relative to the housing rack in the width direction is relatively large.

It is preferable that the transfer device includes, in addition to the contact portion, a transfer driving portion that moves the contact portion so as to protrude from the retracted position to the protruding position along the protruding/retracting direction, and a pivotal support portion that rotatably supports the contact portion about a rotation axis extending along the vertical direction is provided at a connecting portion between the contact portion and the transfer driving portion.

With this configuration, the contact portion that comes into contact with the article can be rotated about the rotation axis so as to follow the article even when the article is inclined relative to the transfer device in a vertical view in the course of transferring the article using the transfer device. Accordingly, it is possible to suppress an excessive load from being exerted on a portion where the article and the contact portion are in contact with each other.

It is preferable that the pivotal support portion includes a resistance portion that provides rotational resistance to relative rotation between the contact portion and the transfer driving portion.

With this configuration, the rotational phase of the contact portion relative to the transfer driving portion can be held in an orientation suitable for coming into contact with the article, and therefore contact with the article can be easily performed in an appropriate manner.

It is preferable that the pair of first guide portions are each configured to swing about a swing axis extending along the vertical direction, the guide driving device is coupled to a protrusion side, which is a side in the protruding/retracting direction where the housing rack is present, relative to a guide center position, which is a center position of the first guide portion in the protruding/retracting direction, and the swing axes are disposed on a retraction side, which is a side opposite to the protrusion side, relative to the guide center position.

With this configuration, the distance between the two first guide portions in the width direction can be changed between the first distance and the second distance by swinging the pair of first guide portions about the swing axes using the guide driving device. Accordingly, it is possible to simplify the configuration for changing the distance between the two first guide portions in the width direction as compared with a case where the distance in the width direction is changed by slidably moving the pair of first guide portions in the width direction.

It is preferable that the control unit controls the guide driving device so as to change the distance between the two first guide portions in conjunction with movement of the contact portion in the protruding/retracting direction.

With this configuration, it is possible to reduce a deviation of timing for changing the distance between the two first guide portions, and also to simplify the configuration for changing the distance between the two first guide portions in the width direction, as compared with, for example, a case where the actual position of an article is detected by a sensor, and the distance between the two first guide portions is changed when the article has been moved to a predetermined position.

DESCRIPTION OF REFERENCE SIGNS

1: Housing rack
2: Article transport vehicle
14: Second guide portion
21: Travel carriage
24: Transfer device
26: Swiveling device
28: First guide portion
29: Guide driving device
46: Engaging portion (contact portion)
47: Transfer driving portion
63: Pivotal support portion
64: Resistance portion
A: Protruding/retracting direction
A1: Protrusion side
A2: Retraction side
B: Width direction
D: Distance between first guide portions in width direction
D1: First distance
D2: Second distance
E: Distance between second guide portions in width direction
H: Control unit
P3: Swing axis
W: Container (article)
WA: Rack-side end portion
Z: Vertical direction

The invention claimed is:

1. An article transport vehicle comprising:
a travel carriage that travels along a housing rack that houses an article; and
a transfer device that is installed on the travel carriage and that transfers an article to the housing rack by moving a contact portion that comes into contact with an article such that the contact portion protrudes from a retracted position to a protruding position along a protruding/retracting direction,
wherein a width direction is a direction orthogonal to the protruding/retracting direction in a vertical view along a vertical direction,
wherein the article transport vehicle further comprises:
a pair of first guide portions that are located on opposite sides in the width direction relative to an article being transferred by the transfer device and that guide the article in the protruding/retracting direction; and
a guide driving device that changes a distance between the two first guide portions in the width direction; and a control unit that controls the guide driving device, and
wherein the control unit controls the guide driving device so as to increase the distance between the two first guide portions in the width direction during a period from start to completion of movement of the contact portion from the retracted position to the protruding position.

2. The article transport vehicle according to claim 1, further comprising
a swiveling device that swivels the transfer device relative to the travel carriage so as to change the protruding/retracting direction of the contact portion in the vertical view.

3. The article transport vehicle according to claim 1,
wherein the housing rack comprises a pair of second guide portions that are located on opposite sides in the width direction relative to an article being transferred by the transfer device and that guide the article in the protruding/retracting direction,
wherein the guide driving device is configured to change the distance between the two first guide portions in the width direction between a first distance corresponding to a distance between the two second guide portions in the width direction, and a second distance wider than the first distance, and
wherein the control unit controls the guide driving device so as to change the distance between the two first guide portions in the width direction from the first distance to the second distance during a period from start to completion of movement of the contact portion from the retracted position to the protruding position.

4. The article transport vehicle according to claim 3,
wherein the control unit controls the guide driving device so as to change the distance between the two first guide portions in the width direction from the first distance to the second distance after a rack-side end portion, which is an end portion on the housing rack side, of an article being transferred by the transfer device has been brought into a state of being guided by the second guide portions.

5. The article transport vehicle according to claim 3,
wherein the transfer device is further configured to transfer an article from the housing rack to the transfer device by moving the contact portion so as to be retracted from the protruding position to the retracted position along the protruding/retracting direction, and
wherein the control unit controls the guide driving device so as to change the distance between the two first guide portions in the width direction from the second distance to the first distance during a period from start to completion of movement of the contact portion from the protruding position to the retracted position, or controls the guide driving device so as to change the distance between the two first guide portions in the width direction from the second distance to the first distance upon completion of movement of the contact portion from the protruding position to the retracted position.

6. The article transport vehicle according to claim 1,
wherein the transfer device comprises, in addition to the contact portion, a transfer driving portion that moves the contact portion so as to protrude from the retracted position to the protruding position along the protruding/retracting direction, and
wherein the transfer device comprises a pivotal support portion that rotatably supports the contact portion about a rotation axis extending along the vertical direction is provided at a connecting portion between the contact portion and the transfer driving portion.

7. The article transport vehicle according to claim 6,
wherein the pivotal support portion comprises a resistance portion that provides rotational resistance to relative rotation between the contact portion and the transfer driving portion.

8. The article transport vehicle according to claim 1,
wherein the pair of first guide portions are each configured to swing about a swing axis extending along the vertical direction,
wherein the guide driving device is coupled to a protrusion side, which is a side in the protruding/retracting direction where the housing rack is present, relative to a guide center position, which is a center position of the first guide portion in the protruding/retracting direction, and wherein the swing axes are disposed on a retraction side, which is a side opposite to the protrusion side, relative to the guide center position.

9. The article transport vehicle according to claim 1,
wherein the control unit controls the guide driving device so as to change the distance between the two first guide portions in conjunction with movement of the contact portion in the protruding/retracting direction.

10. The article transport vehicle according to claim 2,
wherein the housing rack comprises a pair of second guide portions that are located on opposite sides in the width direction relative to an article being transferred by the transfer device and that guide the article in the protruding/retracting direction,
wherein the guide driving device is configured to change the distance between the two first guide portions in the width direction between a first distance corresponding to a distance between the two second guide portions in the width direction, and a second distance wider than the first distance, and
wherein the control unit controls the guide driving device so as to change the distance between the two first guide portions in the width direction from the first distance to the second distance during a period from start to completion of movement of the contact portion from the retracted position to the protruding position.

11. The article transport vehicle according to claim 4,
wherein the transfer device is further configured to transfer an article from the housing rack to the transfer device by moving the contact portion so as to be retracted from the protruding position to the retracted position along the protruding/retracting direction, and
wherein the control unit controls the guide driving device so as to change the distance between the two first guide portions in the width direction from the second distance to the first distance during a period from start to completion of movement of the contact portion from the protruding position to the retracted position, or controls the guide driving device so as to change the distance between the two first guide portions in the width direction from the second distance to the first distance upon completion of movement of the contact portion from the protruding position to the retracted position.

\* \* \* \* \*